(12) United States Patent
Lee et al.

(10) Patent No.: US 11,675,468 B2
(45) Date of Patent: Jun. 13, 2023

(54) DISPLAY DEVICE AND ELECTRONIC DEVICE INCLUDING THE SAME

(71) Applicant: Samsung Display Co., Ltd., Yongin-si (KR)

(72) Inventors: Won-Il Lee, Hwaseong-si (KR); Hwan-Hee Jeong, Cheonan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/589,748

(22) Filed: Jan. 31, 2022

(65) Prior Publication Data
US 2022/0308701 A1 Sep. 29, 2022

(30) Foreign Application Priority Data
Mar. 23, 2021 (KR) .......................... 10-2021-0037495

(51) Int. Cl.
*G06F 3/044* (2006.01)
*H04M 1/02* (2006.01)

(52) U.S. Cl.
CPC .......... *G06F 3/0446* (2019.05); *G06F 3/0441* (2019.05); *G06F 3/0442* (2019.05); *H04M 1/0266* (2013.01); *H04M 2250/22* (2013.01)

(58) Field of Classification Search
CPC .... G06F 3/0446; G06F 3/0441; G06F 3/0442; H04M 1/0266; H04M 2250/22
See application file for complete search history.

(56) References Cited

U.S. PATENT DOCUMENTS

| 7,649,527 | B2 | 1/2010 | Cho et al. | |
|---|---|---|---|---|
| 8,736,565 | B2 | 5/2014 | Kim et al. | |
| 2011/0001717 | A1* | 1/2011 | Hayes | G06F 3/0445 345/173 |
| 2011/0234510 | A1* | 9/2011 | Jeong | G06F 3/0445 345/173 |
| 2012/0075257 | A1* | 3/2012 | Choi | G06F 3/0446 345/176 |
| 2012/0098762 | A1* | 4/2012 | Kim | G06F 3/0446 345/173 |

(Continued)

FOREIGN PATENT DOCUMENTS

| JP | 6758547 B1 | 9/2020 |
|---|---|---|
| KR | 10-0962651 B1 | 6/2010 |
| KR | 10-1282469 B1 | 7/2013 |

*Primary Examiner* — Towfiq Elahi
(74) *Attorney, Agent, or Firm* — Lewis Roca Rothgerber Christie LLP

(57) ABSTRACT

Provided is a display device including a display panel and an input sensing layer including an effective region and a non-effective region. The input sensing layer includes a plurality of sensing electrodes, a plurality of signal lines, and a plurality of input pads. The non-effective region includes a first region, a second region, and a third region, and the signal lines include first sub-lines in the first region and connected to the sensing electrodes, second sub-lines in the second region and connected to the input pads, and third sub-lines in the third region and connecting the first sub-lines and the second sub-lines. An interval between the third sub-lines in the third region is a first interval which is a constant, and the first interval is smaller than a second interval between the first sub-lines and a third interval between the second sub-lines.

20 Claims, 15 Drawing Sheets

(56) References Cited

U.S. PATENT DOCUMENTS

2012/0306776 A1* 12/2012 Kim ............... G06F 3/0446
 345/173
2014/0028599 A1* 1/2014 Jeong ............... G06F 3/047
 345/173

* cited by examiner

DISPLAY DEVICE AND ELECTRONIC DEVICE INCLUDING THE SAME

CROSS-REFERENCE TO RELATED APPLICATION

This application claims priority to and the benefit of Korean Patent Application No. 10-2021-0037495, filed on Mar. 23, 2021, the entire contents of which are hereby incorporated by reference.

BACKGROUND

1. Field

The present disclosure relates to a display device having an input sensing function and an electronic device including the display device.

2. Description of the Related Art

Multimedia electronic devices, such as televisions, mobile phones, tablets, computers, navigation system units, and game consoles, are equipped with a display device for displaying images. The electronic devices may include an input sensing layer that may provide a touch-based input method that allows a user to easily input information or commands intuitively and conveniently, in addition to an input method such as a button, a keyboard, and a mouse.

The input sensing layer may sense a touch or pressure by a user's body. In addition, the input sensing layer may sense a touch or pressure from an input device capable of providing a fine touch input for a user inputting information using a writing instrument or for a specific application program (for example, an application program for sketches or drawings).

SUMMARY

The present disclosure provides a display device for improving the sensing reliability of a display device having an input sensing function and an electronic device including the same.

One or more embodiments of the present disclosure may provide a display device including a display panel configured to display an image, and an input sensing layer on the display panel, the input sensing layer including an effective region configured to sense an external input, and a non-effective region adjacent the effective region, wherein the input sensing layer includes sensing electrodes in the effective region, signal lines in the non-effective region and electrically connected to the sensing electrodes, and input pads in the non-effective region and electrically connected to the signal lines, wherein the non-effective region includes a first region, a second region, and a third region, wherein the signal lines include first sub-lines in the first region and electrically connected to the sensing electrodes, second sub-lines in the second region and electrically connected to the input pads, and third sub-lines in the third region and electrically connecting the first sub-lines and the second sub-lines, wherein an interval between the third sub-lines in the third region is a first interval that is a constant, and wherein the first interval is smaller than a second interval between the first sub-lines and a third interval between the second sub-lines.

The non-effective region may further include a pad region in which the input pads are located, the first region may be adjacent the effective region, the second region may be adjacent the pad region, and the third region may be adjacent the first region and the second region.

The sensing electrodes may include a transmission electrode, and a reception electrode electrically insulated from the transmission electrode, and wherein the signal lines may include a transmission signal line electrically connected to the transmission electrode, and a reception signal line electrically connected to the reception electrode.

The input sensing layer may further include a first ground line between the transmission signal line and the reception signal line, and wherein the first ground line is electrically connected to a ground power source.

The input sensing layer may further include a dummy electrode between the transmission signal line and the reception signal line.

The input sensing layer may further include a second ground line surrounding the dummy electrode, and wherein the second ground line is coupled to a ground power source.

The dummy electrode may include sub-dummy electrodes that are spaced apart from each other.

A fourth interval between two adjacent sub-dummy electrodes of the sub-dummy electrodes may be substantially the same as the first interval.

The transmission signal line may include a first transmission signal line connected to a first end of the transmission electrode, and a second transmission signal line connected to a second end of the transmission electrode, and the input pads may include a first transmission input pad electrically connected to the first transmission signal line, a second transmission input pad electrically connected to the second transmission signal line, and a reception input pad electrically connected to the reception signal line.

The reception input pad is between the first transmission input pad and the second transmission input pad.

The input pads may be on the input sensing layer such that the length of the first transmission signal line may be greater than the length of the second transmission signal line, wherein the input sensing layer further includes a third ground line between the first transmission signal line and the reception signal line, and wherein the third ground line is electrically connected to a ground power source.

The dummy electrode may be between the second transmission signal line and the reception signal line, wherein the input sensing layer further includes a fourth ground line between the dummy electrode and the second transmission signal line, and wherein the fourth ground line is electrically connected to the ground power source.

The third sub-lines in the third region may include a step shape.

The input pads may be arranged in a first direction, and wherein a third portion in the third region includes a portion extending in a second direction crossing the first direction.

According to other embodiments of the present disclosure, an electronic device may include a display panel configured to display an image, an input sensing layer on the display panel, configured to operate in a first mode for sensing a first input, or in a second mode for sensing a second input, and including an effective region configured to sense the first input or the second input, and a non-effective region adjacent the effective region, and an input device configured to provide the second input to the input sensing layer, wherein the input sensing layer includes sensing electrodes in the effective region, signal lines in the non-effective region and electrically connected to the sensing electrodes, and input pads in the non-effective region and electrically connected to the signal lines, wherein the non-effective region includes a first region, a second region, and a third region, wherein the signal lines include first sub-lines in the first region and electrically connected to the sensing electrodes, second sub-lines in the second region and electrically connected to the input pads, and third sub-lines in the third region and electrically connecting the first sub-lines and the second sub-lines, wherein an interval between the third sub-lines in the third region is a first interval which is a constant, and wherein the first interval is smaller than a second interval between the first sub-lines and a third interval between the second sub-lines.

The sensing electrodes may include a transmission electrode, and a reception electrode electrically insulated from the transmission electrode, and the signal lines may include a transmission signal line electrically connected to the transmission electrode, and a reception signal line electrically connected to the reception electrode.

The input sensing layer further may include a dummy electrode between the transmission signal line and the reception signal line.

The dummy electrode may include sub-dummy electrodes spaced apart from each other, and wherein a fourth interval between two adjacent sub-dummy electrodes of the sub-dummy electrodes is the same as the first interval.

The transmission signal line may include a first transmission signal line connected to a first end of the transmission electrode, and a second transmission signal line connected to a second end of the transmission electrode, and the input pads may include a first transmission input pad electrically connected to the first transmission signal line, a second transmission input pad electrically connected to the second transmission signal line, and a reception input pad electrically connected to the reception signal line, wherein the reception input pad is between the first transmission input pad and the second transmission input pad, and wherein the dummy electrode is between the reception signal line and the second transmission signal line in response to the input pads being on the input sensing layer such that the length of a third sub-line of the first transmission signal line is greater than the length of a third sub-line of the second transmission signal line.

The first input may be an input generated by a contact of a finger of a user, and wherein the second input may be an input generated in response to the input device approaching the electronic device.

BRIEF DESCRIPTION OF THE DRAWINGS

The accompanying drawings are included to provide a further understanding of the present disclosure, and are incorporated in and constitute a part of this specification. The drawings illustrate various embodiments of the present disclosure and, together with the description, serve to explain aspects of the embodiments of the present disclosure. In the drawings.

DETAILED DESCRIPTION

Figure 1:
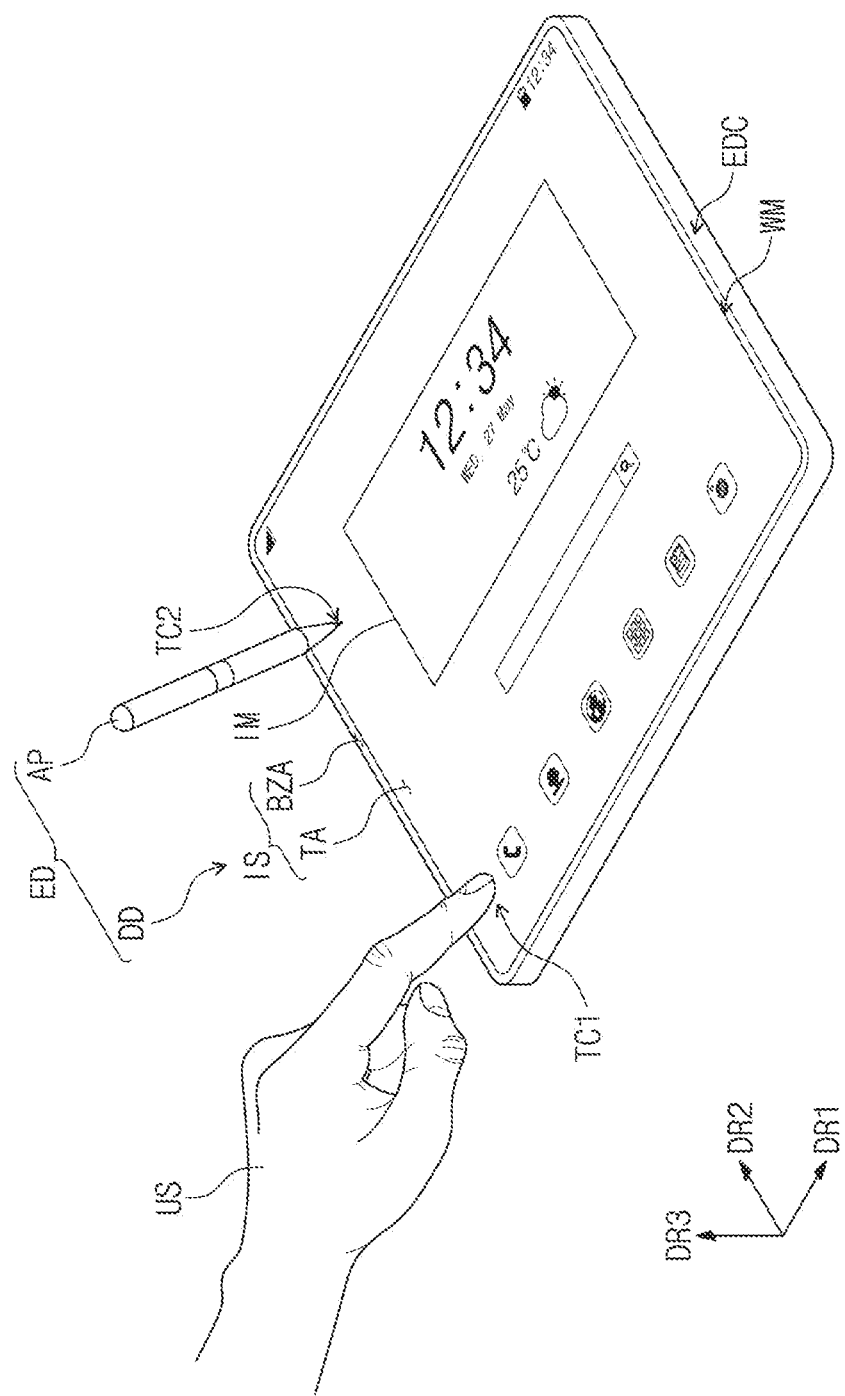
FIG. 1 is a perspective view of an electronic device according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, embodiments of the present disclosure will be described with reference to the accompanying drawings.

Figure 2:
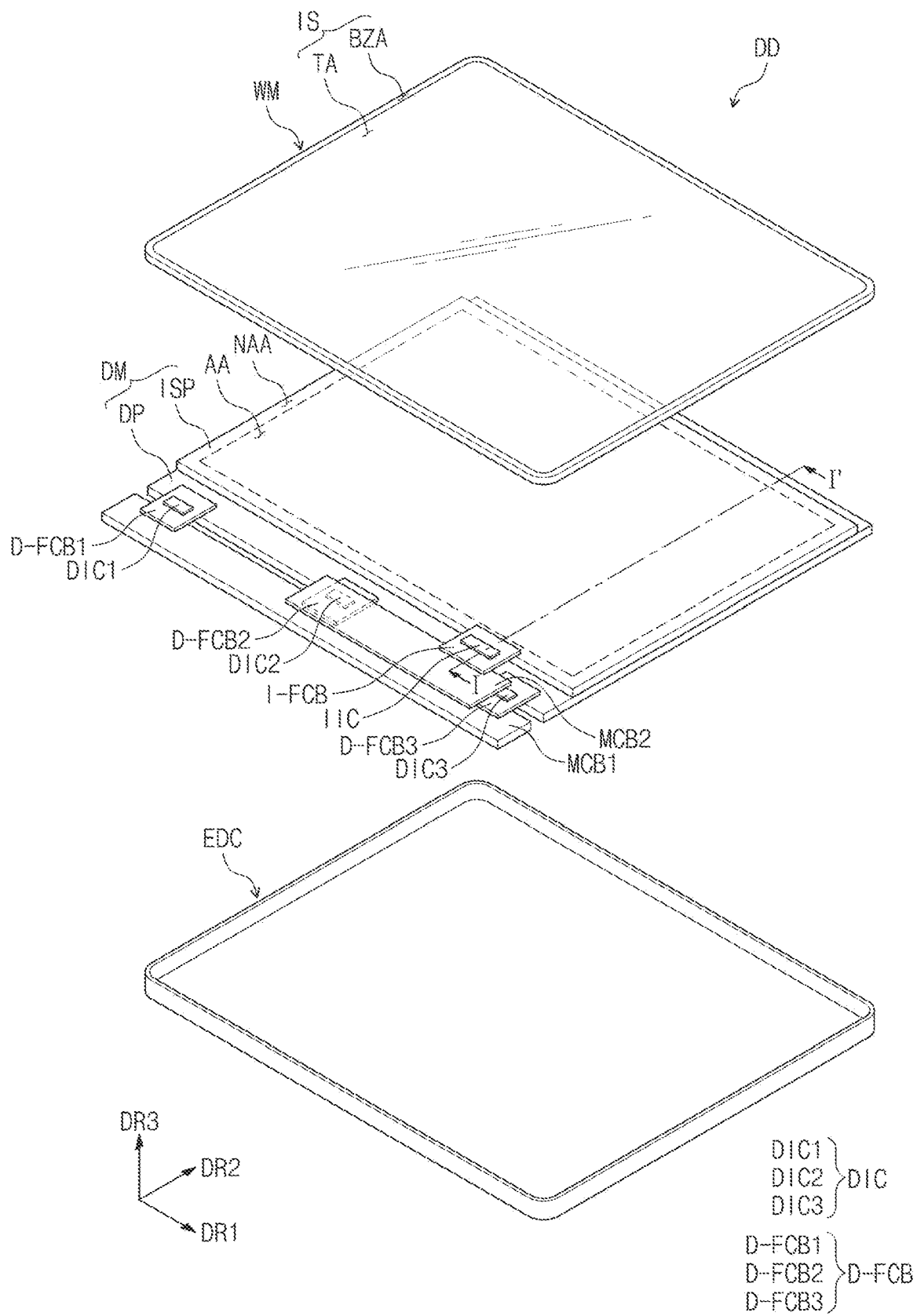
FIG. 2 is an exploded perspective view of a display device illustrated in FIG. 1.

FIG. 1 is a perspective view of an electronic device according to some embodiments of the present disclosure, and FIG. 2 is an exploded perspective view of a display device illustrated in FIG. 1.

Referring FIG. 1 and FIG. 2, an electronic device ED may include a display device DD and an input device AP.

The display device DD may be a device activated by an electrical signal. The display device DD according to the present disclosure may be a large-sized display device, such as a television or a monitor, or may be a small- to medium-sized display device, such as a mobile phone, a tablet computer, a car navigation system unit, or a game console. It should be understood that these devices are provided as examples of some embodiments, and the display device DD may be employed in other electronic devices without departing from the present disclosure. In FIG. 1, the display device DD having a tablet computer shape is illustrated. However, the concepts of the present disclosure is not limited thereto.

The display device DD may have a rectangular shape that has long sides in a first direction DR1, and short sides in a second direction DR2 that crosses the first direction DR1. However, the shape of the display device DD is not limited thereto. The display device DD of various shapes may be provided. The display device DD may display an image IM that is visible in a third direction DR3 on a display surface IS that is substantially parallel to each of the first direction DR1 and the second direction DR2. The display surface IS on which the image IM is displayed may correspond to the front surface of display device DD. The image IM may include both a moving image and a still image.

In some embodiments, a front surface (or an upper surface) and a back surface (or a lower surface) of each member are defined according to a direction in which the image IM is displayed. The front surface and the back surface may oppose each other in the third direction DR3 and the normal direction of each of the front surface and the back surface may be parallel to the third direction DR3.

The separation distance between the front surface and the back surface in the third direction DR3 may correspond to the thickness of the display device DD in the third direction DR3. Meanwhile, the directions indicated by the first to third directions DR1, DR2, and DR3 are relative to each other, and therefore may be referred to by using different directions.

In some embodiments, the display device DD may sense an external input applied from the outside (e.g., from the outside of the display device DD). The external input may include various forms of inputs provided from the outside of the display device DD. The display device DD according to some embodiments of the present disclosure may sense a first input TC1 of a user US. The first input TC1 of the user US may be various forms of external inputs, such as a part of a user's body, light, heat, pressure, or a combination thereof. According to some embodiments of the present disclosure, the first input TC1 of the user US is assumed to be a touch input by a hand of the user US applied to the front surface of the display device DD by way of example only. In other embodiments, the first input TC1 of the user US may be provided in other forms such as those described above. In addition, depending on the structure of the display device DD, the display device DD may sense the first input TC1 of the user US applied to a side surface or a back surface of the display device DD, and is not limited to any some embodiments.

In addition, the display device DD according to some embodiments of the present disclosure may sense a second input TC2 applied from the outside. For example, in addition to the hand of the user US, the second input TC2 may include inputs by the input device AP (for example, a stylus pen, an active pen, a touch pen, an electronic pen, an e-pen, and the like) included in the electronic device ED. In the following description, the case in which the second input TC2 is an input by an active pen will be described as an example.

In some embodiments, the display device DD and the input device AP may communicate in a bidirectional manner. The display device DD may provide an up-link signal ULS (see FIG. 4) to the input device AP. For example, the up-link signal ULS may include a synchronization signal or information on the display device DD, but the embodiments of the present disclosure are not particularly limited thereto. In some embodiments, the input device AP may provide a down-link signal DLS (see FIG. 4) to the display device DD.

The down-link signal DLS may include a synchronization signal or information on the state of the input device AP. For example, the down-link signal DLS may include position information of the input device AP, battery information of the input device AP, slope information of the input device AP, and/or various other information that may be stored in the input device AP, but the present disclosure is not particularly limited thereto. The up-link signal ULS and the down-link signal DLS will be described later in the description of FIG. 4. In some embodiments, the front surface of display device DD may be divided into a transmissive region TA and a bezel region BZA. The transmissive region TA may be a region on which the image IM is displayed. A user may visually recognize the image IM through the transmissive region TA. According to some embodiments, the transmissive region TA is illustrated as having vertices in a rounded quadrangular shape. However, this is only an example. The transmissive region TA may have various shapes, and is not limited to the described embodiments.

In some embodiments, the bezel region BZA is adjacent to the transmissive region TA. The bezel region BZA may have a color (e.g., a predetermined color). The bezel region BZA may surround the transmissive region TA. Accordingly, the shape of the transmissive region TA may be substantially defined by the bezel region BZA. However, this is only an example. The bezel region BZA may be adjacent to only one side of the transmissive region TA, or the bezel region BZA may be omitted. The display device DD according to some embodiments of the present disclosure may include various embodiments, and is not limited to any some embodiments.

As illustrated in FIG. 2, the display device DD may include the display module DM, and a window WM on the display module DM. The display module DM may include a display panel DP and an input sensing layer ISP.

The display panel DP according to some embodiments of the present disclosure may be a light emitting type display panel, but is not particularly limited thereto. For example, the display panel DP may be an organic light emitting display panel or a quantum dot light emitting display panel. A light emitting layer of an organic light emitting display panel may include an organic light emitting material. A light emitting layer of a quantum dot light emitting display panel may include a quantum dot, a quantum load, and the like. Hereinafter, the display panel DP will be described as an organic light emitting display panel. Accordingly, the display panel DP outputs the image IM, and the output image may be displayed through the display surface IS.

The input sensing layer ISP may be located on the display panel DP to sense the first input TC1 and the second input TC2. The configuration and operation of the input sensing layer ISP will be described later with reference to FIG. 3 to FIG. 5.

The window WM may be made of a transparent material capable of emitting the image IM. For example, the window WM may be composed of glass, sapphire, plastic, or the like. Although the described window WM is illustrated as being a single layer, the embodiments of the present disclosure are not limited thereto. The window WM may include a plurality of layers.

In some embodiments, the bezel region BZA of the display device DD described above may be substantially provided as a region in which a material including a color (e.g., a predetermined color) is printed in one region of the window WM. For example, the window WM may include a light blocking pattern that defines the bezel region BZA. The light blocking pattern may be a colored organic film, and may be formed, for example, in a coating manner.

In some embodiments, the window WM may be coupled to the display module DM through an adhesive film. For example, the adhesive film may include an optically clear adhesive (OCA) film. However, the adhesive film is not limited thereto, and may include a typical adhesive or a typical pressure-sensitive adhesive. For example, the adhesive film may include an optically clear resin (OCR) or a pressure sensitive adhesive film (PSA).

Between the window WM and the display module DM, a reflection prevention layer (e.g., reflection reduction layer) may further be arranged. The reflection prevention layer reduces the reflectance of an external light incident from an upper side of the window WM. The refection prevention layer according to some embodiments of the present disclosure may include a phase retarder and a polarizer. The phase retarder may be of a film type or a liquid crystal coating type, and may include a $\lambda/2$ phase retarder and/or a $\lambda/4$ phase retarder. The polarizer may also be of a film type or a liquid crystal coating type. The film type polarizer may include a stretchable synthetic resin film, and the liquid crystal coating type polarizer may include liquid crystals arranged (e.g., in a predetermined arrangement). The phase retarder and the polarizer may be implemented as a single polarizing film.

In some embodiments, the display module DM displays an image in accordance with an electrical signal, and may transmit/receive information based on an external input. The display module DM may be defined as an effective region AA and a non-effective region NAA. The effective region AA may be defined as a region that emits an image provided from the display module DM. In addition, the effective region AA may be defined as a region in which the input sensing layer ISP senses the first input TC1 and the second input TC2 applied from the outside.

The non-effective region NAA may be adjacent to the effective region AA. For example, the non-effective region NAA may surround the effective region AA. However, this is only an example. The non-effective region NAA may be defined as various shapes, and is not limited to any some embodiments. According to some embodiments, the effective region AA of the display module DM may correspond to at least a portion of the transmissive region TA.

The display module DM may further include a first main circuit board MCB1, a first flexible circuit film D-FCB, and a first driving chip DIC. The first main circuit board MCB1 may be connected to the first flexible circuit film D-FCB to be electrically connected to the display panel DP. The first flexible circuit film D-FCB is connected to the display panel DP to electrically connect the display panel DP and the first main circuit board MCB1.

The first main circuit board MCB1 may include a plurality of driving elements. The plurality of driving elements may include a circuit unit for driving the display panel DP. On the first flexible circuit film D-FCB, the first driving chip DIC may be mounted. According to an example of the present disclosure, the first flexible circuit film D-FCB may include a first sub-flexible circuit film D-FCB1, a second sub-flexible circuit film D-FCB2, and a third sub-flexible circuit film D-FCB3. The first driving chip DIC may include a first sub-driving chip DIC1, a second sub-driving chip DIC2, and a third sub-driving chip DIC3. In this case, the first to third flexible circuit films D-FCB1 to D-FCB3 may be spaced apart from each other at regular intervals, and may be connected to the display panel DP to electrically connect the display panel DP and the first main circuit board MCB1. On the first sub-flexible circuit film D-FCB1, the first sub-driving chip DIC1 may be mounted. On the second sub-flexible circuit film D-FCB2, the second sub-driving chip DIC2 may be mounted. On the third sub-flexible circuit film D-FCB3, the third sub-driving chip DIC3 may be mounted. However, the embodiments of the present disclosure are not limited thereto. For example, the display panel DP may be electrically connected to the main circuit board MCB1 through one flexible circuit film, and only the first driving chip DIC may be mounted on the one flexible circuit film. In addition, the display panel DP may be electrically connected to the main circuit board MCB1 through four or more flexible circuit films, and on the flexible circuit films, sub-driving chips may be mounted, respectively. In some embodiments, the first driving chip DIC may be directly mounted on the display panel DP. In this case, a portion of the display panel DP in which the first driving chip DIC is mounted may be bent and located on a back surface of the display module DM. The first driving chip DIC may include driving elements for driving pixels of the display panel DP, for example, a data driving circuit.

The display module DM may further include a second main circuit board MCB2, a second flexible circuit film I-FCB, and a second driving chip IIC. The second main circuit board MCB2 may be connected to the second flexible circuit film I-FCB to be electrically connected to the input sensing layer ISP. The second flexible circuit I-FCB is connected to the input sensing layer ISP to electrically connect the input sensing layer ISP and the second main circuit board MCB2.

The second main circuit board MCB2 may include a plurality of driving elements. The plurality of driving elements may include a circuit unit for driving the input sensing layer ISP. On the second flexible circuit I-FCB, the second driving chip IIC may be mounted. However, the embodiments of the present disclosure are not limited thereto. The second driving chip IIC may be mounted on the first flexible circuit film D-FCB or on the first main circuit board MCB1. In addition, the second main circuit board MCB2 illustrated in FIG. 2 may be omitted, and the second flexible circuit film I-FCB may be directly connected to the first main circuit board MCB1.

In some embodiments, the display device DD further includes an external case EDC, which receives the display module DM. The external case EDC may be coupled to the window WM, and may define the appearance of the display device DD. The external case EDC absorbs impacts applied from the outside and reduces (e.g., prevents) foreign materials/moisture and the like from penetrating into the display module DM to protect components received in the external case EDC. Meanwhile, according to some embodiments of the present disclosure, the external case EDC may be provided in a form in which a plurality of housing members are coupled to each other.

The display device DD according to some embodiments of the present disclosure may further include an electronic module including various functional modules for operating the display module DM, a power supply module for supplying power required for the overall operation of the display device DD, a bracket coupled to the display module DM and/or the external case EDC and dividing the inner space of display device DD, and the like.

Figure 3:
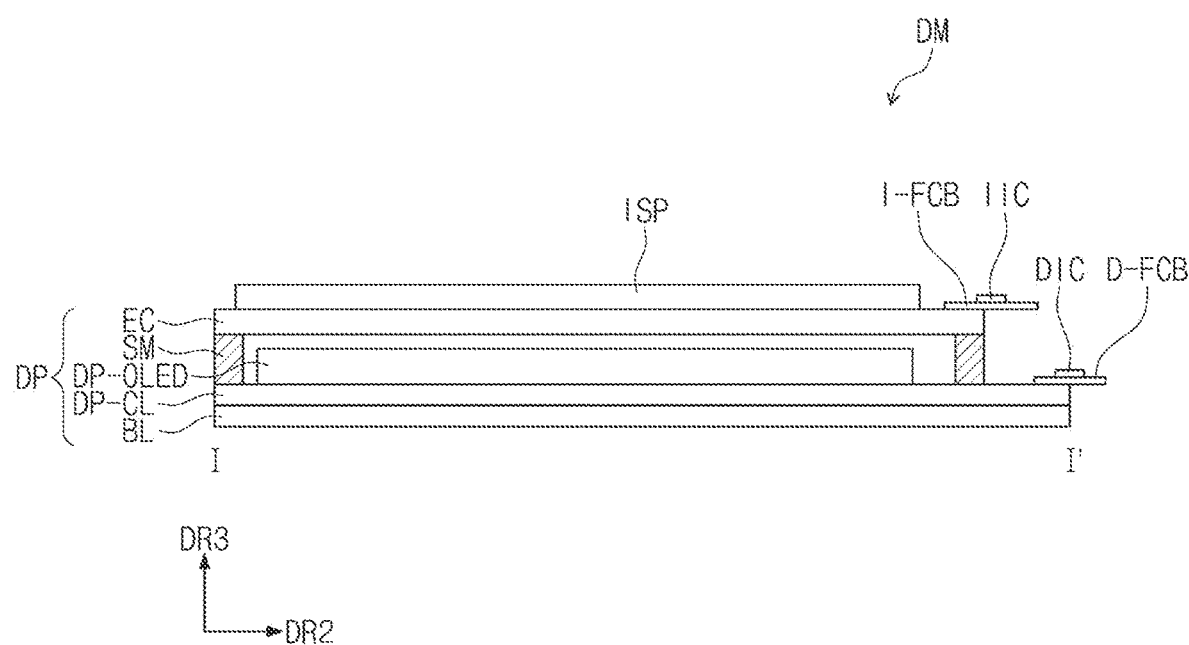
FIG. 3 is a cross-sectional view of a display module DM taken along the line I-I' illustrated in FIG. 2.

FIG. 3 is a cross-sectional view of a display module DM taken along the line I-I' illustrated in FIG. 2.

Referring to FIG. 3, the display module DM includes the display panel DP and the input sensing panel ISP. The display panel DP includes a base layer BL, a circuit element layer DP-CL on the base layer BL, a display element layer DP-OLED, an encapsulation substrate EC, and a sealant SM for bonding the circuit element layer DP-CP and the encapsulation substrate EC. The display panel DP may further include functional layers such as a reflection prevention layer and a refractive index control layer.

The base layer BL may include at least one plastic film. The base layer BL may include a plastic substrate, a glass substrate, a metal substrate, or an organic/inorganic composite material substrate, and the like.

The circuit element layer DP-CL includes at least one intermediate insulation layer and a circuit element. The intermediate insulation layer includes at least one intermediate inorganic layer and at least one intermediate organic layer. The circuit element includes signal lines, a driving circuit of a pixel, and the like.

The display element layer DP-OLED includes a light emitting element. The light emitting element may include at least organic light emitting diodes. The display element layer DP-OLED may include an organic film such as a pixel definition film.

The encapsulation substrate EC may be on the display element layer DP-OLED and may face the base layer BL. The encapsulation substrate EC may include a plastic substrate, a glass substrate, a metal substrate, or an organic/inorganic composite material substrate, and the like.

Between the encapsulation substrate EC and the base layer BL, the sealant SM may be located. The encapsulation substrate EC and the base layer BL may be bonded to each other by the sealant SM. The sealant SM may include an organic adhesive member or frit, and the like. Frit may be a ceramic adhesive material, and has properties of being cured after exposure to laser. Frit may contain about 15 to about 40 wt % of V2O5, about 10 to about 30 wt % of TeO2, about 1 to about 15 wt % of P2O5, about 1 to about 15 wt % of BaO, about 1 to about 20 wt % of ZnO, about 5 to about 30 wt % of ZrO2, about 5 to about 20 wt % of %, WO3 5, about 1 to about 15 wt % of BaO as main components, and may include one or more of Fe2O3, CuO, MnO, Al2O3, Na2O, and Nb2O5 as an additive. Frit of the above composition may have properties in which the thermal expansion coefficient thereof is about 40 to about 100×10−7/° C., and the glass transition temperature thereof is about 250° C. to about 400° C. The display element layer DP-OLED may be sealed by the sealant SM and the encapsulation substrate EC, so that the light emitting element may be prevented from being damaged by external moisture and the like. The encapsulation substrate EC may be spaced apart from the display element layer DP-OLED at an interval (e.g., a predetermined interval). In this case, a filler may be filled between the encapsulation substrate EC and the display element layer DP-OLED.

The input sensing layer ISP may be formed on the display panel DP by a continuous process. In addition, the input sensing layer ISP and the display panel DP may be bonded to each other through an adhesive film. The input sensing layer ISP may have a multi-layered structure. The input sensing layer ISP may include a single-layered or a multi-layered insulation layer. According to some embodiments of the present disclosure, when the input sensing layer ISP is directly on the display panel DP by a continuous process, the input sensing layer ISP is directly on the encapsulation substrate EC, and an adhesive film is not between the input sensing layer ISP and the display panel DP. However, according to another example, an adhesive film may be applied between the input sensing layer ISP and the display panel DP. In this case, the input sensing layer ISP is not manufactured by a continuous process with the display panel DP, but may be manufactured through a separate process from the display panel DP, and then fixed on an upper surface of the display panel DP by an adhesive film.

As an example of the present disclosure, the base layer BL and the circuit element layer DP-CL may have a larger area than the encapsulation substrate EC. The first flexible circuit film D-FCB may be bonded to a portion of the circuit element layer DP-CL exposed from the encapsulation substrate EC. On the first flexible circuit film D-FCB, the first driving chip DIC may be mounted.

According to some embodiments of the present disclosure, the encapsulation substrate EC may have a larger area than the input sensing layer ISP. The second flexible circuit film I-FCB may be bonded to a portion of the conductive layer exposed from an insulation layer included in the input sensing layer ISP. On the second flexible circuit I-FCB, the second driving chip IIC may be mounted.

Figure 4:
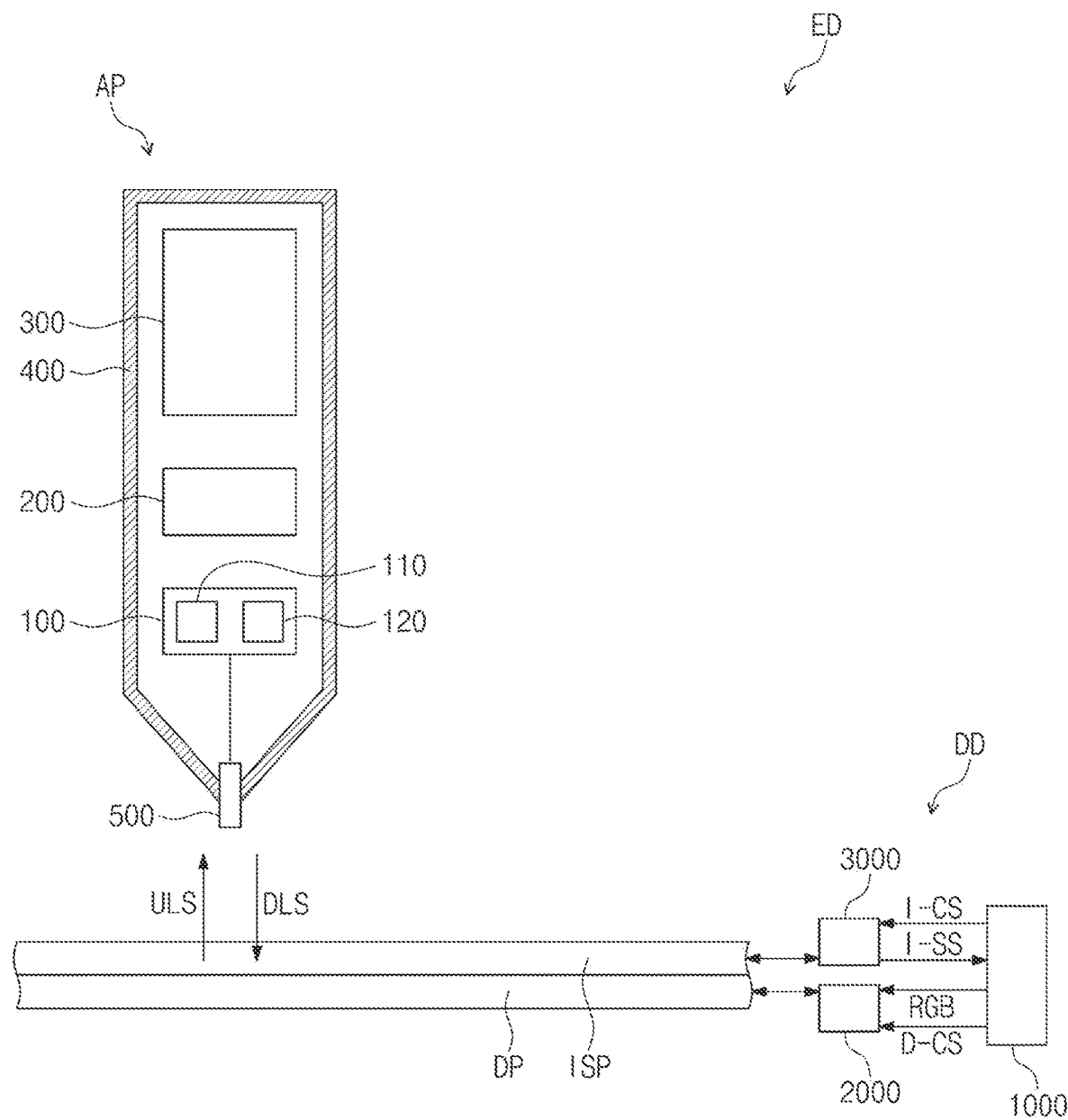
FIG. 4 is a block diagram schematically illustrating a display device and an input device according to some embodiments of the present disclosure.

FIG. 4 is a block diagram schematically illustrating a display device and an input device according to some embodiments of the present disclosure.

Referring FIG. 4, the electronic device ED may include the display device DD and the input device AP. The display device DD may include the display panel DP, the input sensing layer ISP, a panel controller 2000, a sensing controller 3000, and a main controller 1000.

In some embodiments, the input sensing layer ISP is on the display panel DP, and may sense an input applied from the outside. The input sensing layer ISP may sense the first input TC1 (see FIG. 1) by the user US (see FIG. 1) and the second input TC2 (see FIG. 1) by the input device AP.

The main controller 1000 may control the overall operation of the display device DD. According to some embodiments of the present disclosure, the main controller 1000 may control the operation of the panel controller 2000 and the operation of the sensing controller 3000.

The panel controller 2000 may receive image data RGB and a control signal D-CS from the main controller 1000. The control signal D-CS may include various signals. For example, the control signal D-CS may include a vertical synchronization signal, a horizontal synchronization signal, a main clock, a data enable signal, and the like. Based on the control signal D-CS, the panel controller 2000 may generate a vertical start signal and a horizontal start signal to control the timing of providing a signal to the display panel DP. The sensing controller 3000 may control the input sensing layer ISP. The sensing controller 3000 may receive a sensing control signal I-CS from the main controller 1000. The sensing control signal I-CS may include a mode determination signal, a clock signal, and the like for determining the driving mode of the sensing controller 3000. Based on the sensing control signal I-CS, the sensing controller 3000 may control the input sensing layer ISP to be in a first mode of sensing the first input TC1 by the body of the user US or in a second mode of sensing the second input TC2 by the input device AP. Based on the mode determination signal, the input sensing layer ISP may operate in the first mode or the second mode.

Based on a signal received from the input sensing layer ISP, the sensing controller 3000 may calculate coordinate information either of the first input TC1 or of the second input TC2, and may provide a coordinate signal I-SS, which includes the coordinate information, to the main controller 1000. The main controller 1000 executes an operation corresponding to a user input based on the coordinate signal I-SS. For example, based on the coordinate signal I-SS, the main controller 1000 may operate the panel controller 2000 such that a new image is displayed on the display panel DP.

The input device AP may include a communication module 100, a pen controller 200, a power source 300, a housing 400, and a pen electrode 500. However, components constituting the input device AP are not limited to the components listed above. For example, the input device AP may further include an electrode switch for switching to a signal transmission mode or a signal reception mode, a pressure sensor for sensing pressure, a memory for storing information (e.g., predetermined information), a rotation sensor for sensing rotation, or the like.

The housing 400 may have a pen shape, and an accommodation space may be formed therein. In the accommodation space defined inside the housing 400, the power source 300, the pen controller 200, the communication module 100, and the pen electrode 500 (e.g., a portion of the pen electrode 500) may be housed.

The power source 300 may supply power to the pen controller 200, the communication module 100, and the like inside the input device AP. The power source 300 may include a battery or a high-capacity capacitor.

The pen controller 200 may control the operation of the input device AP. The pen controller 200 may be an application-specific integrated circuit (ASIC). The pen controller unit 200 may be configured to operate according to a designed program.

The communication module 100 may include a transmission circuit 110 and a reception circuit 120. The transmission circuit 110 may output the down-link signal DLS to the input sensing layer ISP. The reception circuit 120 may receive the up-link signal ULS provided from the input sensing layer ISP. The transmission circuit 110 may receive a signal provided from the pen controller 200, and may modulate the signal into a signal that can be sensed by the input sensing layer ISP, and the reception circuit 120 may modulate a signal provided from the input sensing layer ISP into a signal that can be processed by the pen controller 200.

The pen electrode 500 may be electrically connected to the communication module 100. A portion of the pen electrode 500 may protrude from the housing 400. Alternatively, the input device AP may further include a cover housing for covering the pen electrode 500 exposed from the housing 400. Alternatively, the pen electrode 500 may be embedded inside the housing 400.

Figure 5:
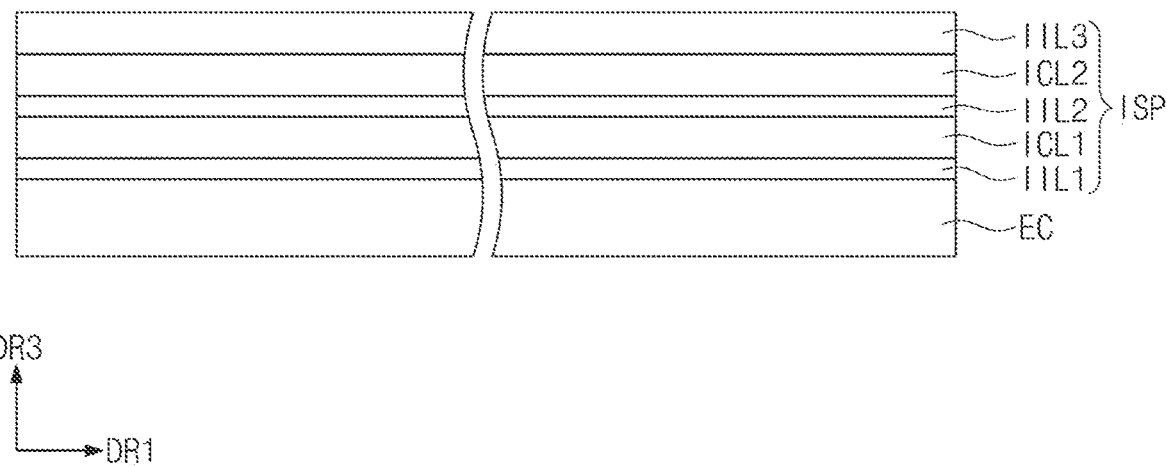
FIG. 5 is a cross-sectional view showing the configuration of an input sensing layer and of an encapsulation substrate illustrated in FIG. 2.

FIG. 5 is a cross-sectional view showing the configuration of an input sensing layer and of an encapsulation substrate according to some embodiments of the present disclosure.

Referring to FIG. 5, the input sensing layer ISP according to some embodiments of the present disclosure may include a first sensing insulation layer IIL1, a first conductive layer ICL1, a second sensing insulation layer IIL2, a second conductive layer ICL2, and a third sensing insulation layer IIL3. The first sensing insulation layer IIL1 may be directly on the encapsulation substrate EC. In some embodiments, the first sensing insulation layer IIL1 may be omitted.

Each of the first conductive layer ICL1 and the second conductive layer ICL2 include a plurality of conductive patterns. The conductive patterns may include sensing electrodes SE1_1 to SE1_4 and SE2_1 to SE2_6 (see FIG. 6), and signal lines SL1_1a to SL1_4a, SL1_1b to SL1_4b, and SL2-1 to SL2_6 connected thereto (see FIG. 6).

Each of the first sensing insulation layer IIL1 to the third sensing insulation layer IIL3 may include an inorganic matter or an organic matter. In the some embodiments, the first sensing insulation layer IIL1 and the second sensing insulation layer IIL2 may each be an inorganic layer. The inorganic layer may include at least one of, an aluminum oxide, a titanium oxide, a silicon oxide, silicon oxynitride, a zirconium oxide, and a hafnium oxide. The thickness of the inorganic layer may be 1000 angstroms to 4000 angstroms.

The third sensing insulation layer IIL3 may be an organic layer. The organic layer may include at least one of, an acryl resin, a methacryl-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin. The third sensing insulation layer IIL3 including an organic material may reduce or prevent moisture and the like from entering the first conductive layer ICL1 and the second conductive layer ICL2 from the outside.

Figure 6:
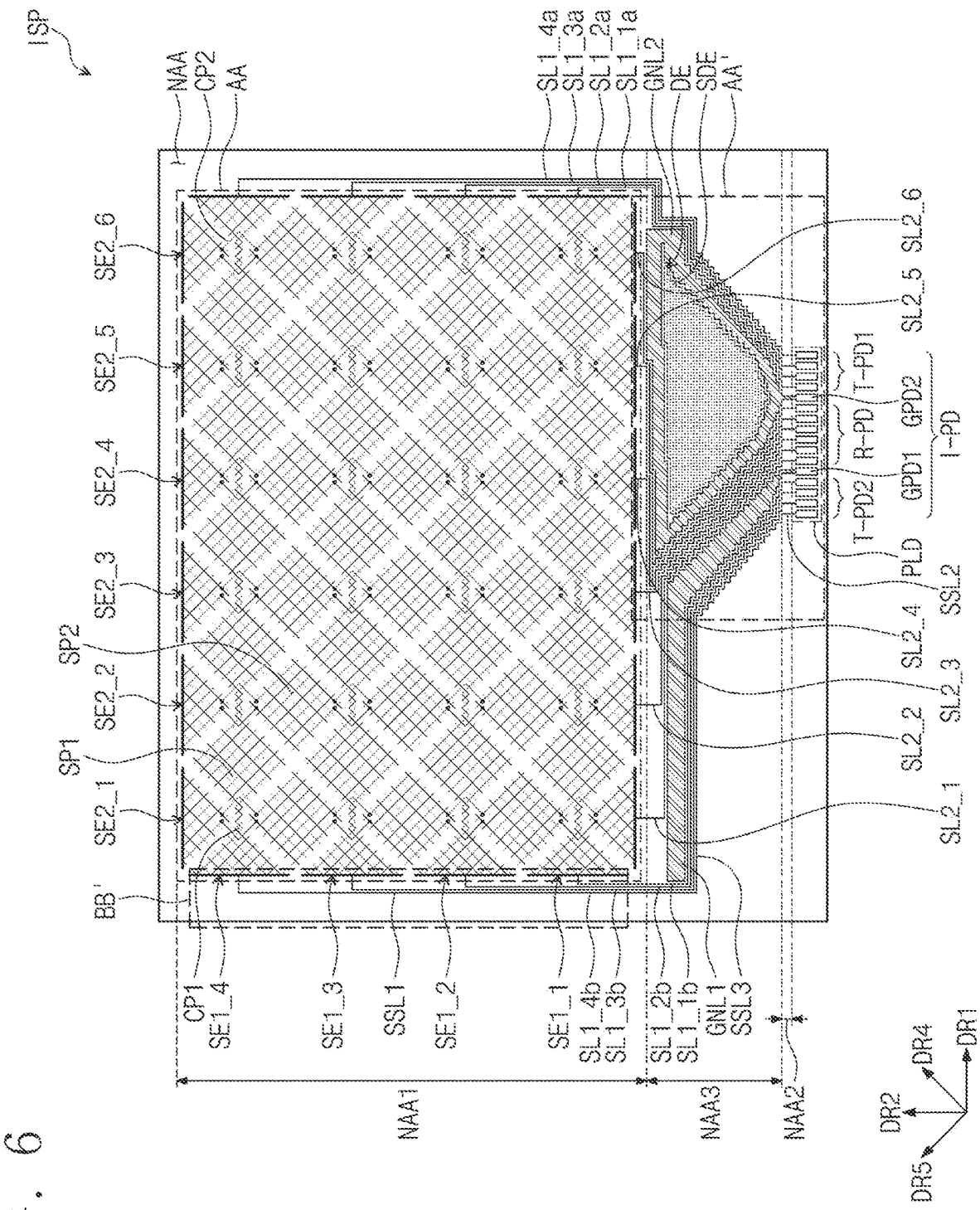
FIG. 6 is a plan view illustrating the configuration of an input sensing layer illustrated in FIG. 2.
Figure 7A:
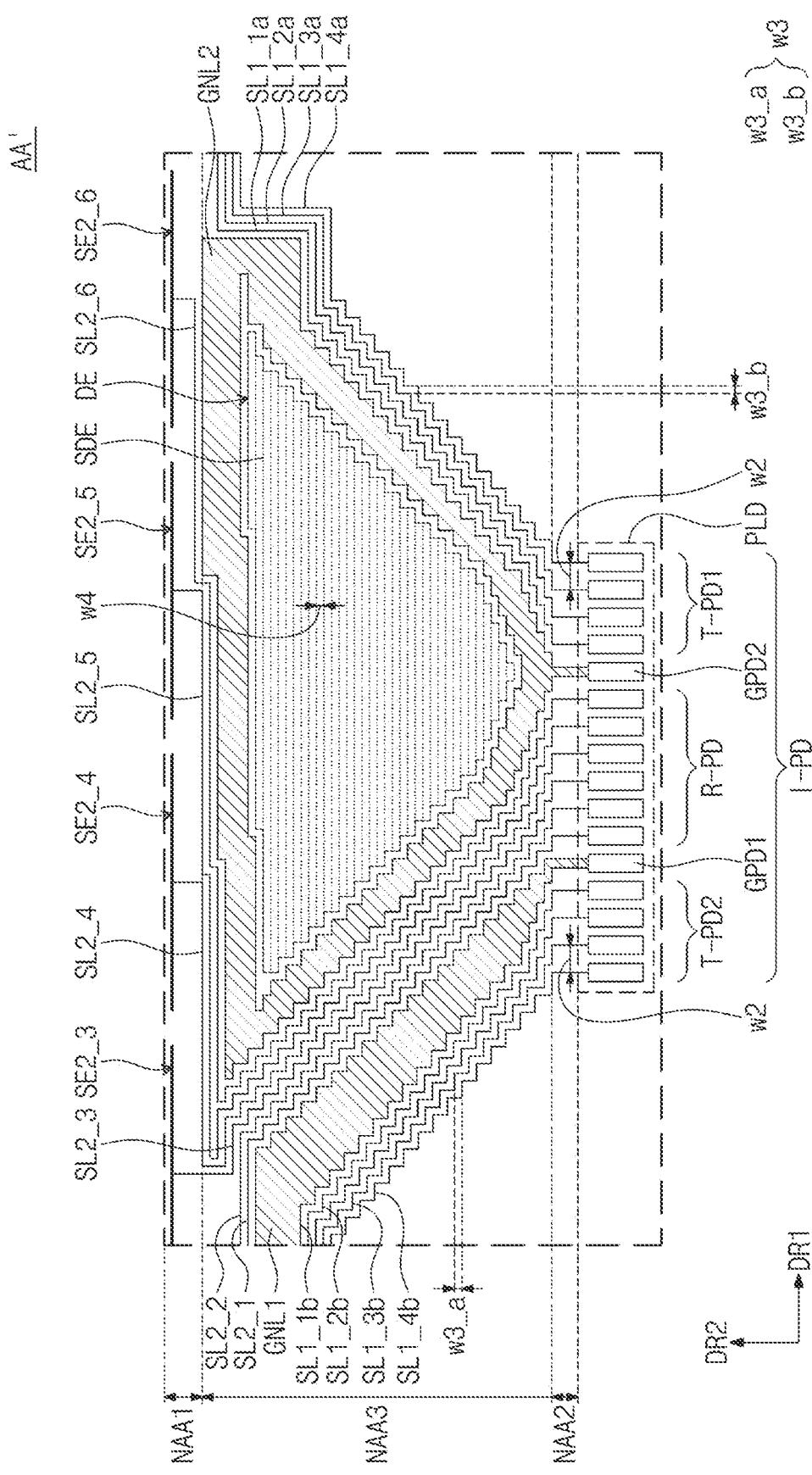
FIG. 7A is an enlarged plan view illustrating an enlarged portion of an input sensing layer corresponding to the portion AA' of FIG. 6.
Figure 7B:
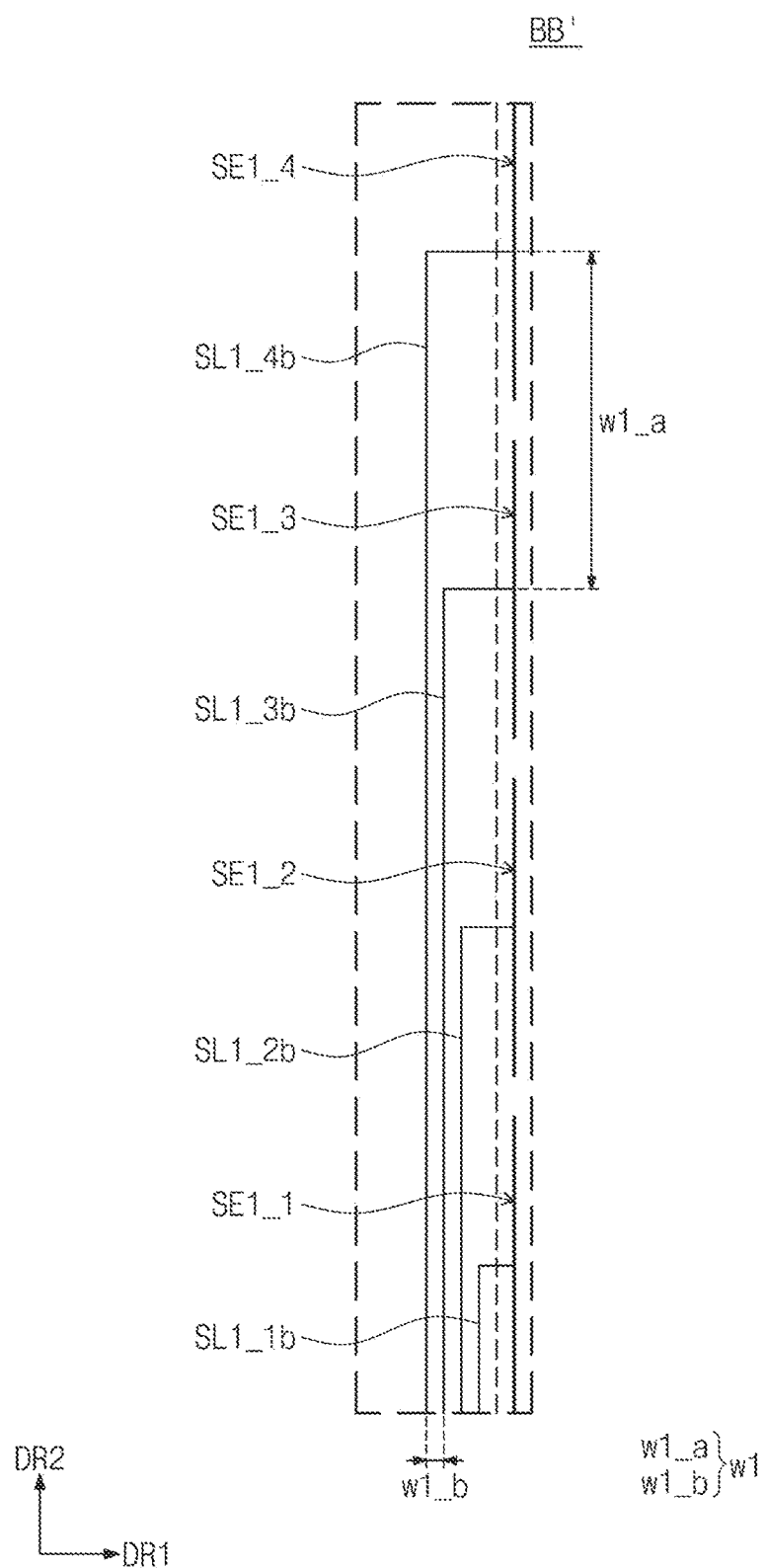
FIG. 7B is an enlarged plan view illustrating an enlarged portion of an input sensing layer corresponding to the portion BB' of FIG. 6.

FIG. 6 is a plan view showing the configuration of an input sensing layer according to some embodiments of the present disclosure. FIG. 7A is an enlarged plan view illustrating an enlarged portion of an input sensing layer corresponding to the portion AA' of FIG. 6, and FIG. 7B is an enlarged plan view illustrating an enlarged portion of an input sensing layer corresponding to the portion BB' of FIG. 6.

Referring to FIG. 6, the input sensing layer ISP according to various embodiments of the present disclosure may include a plurality of sensing electrodes SE1_1 to SE1_4 and SE2_1 to SE2_6 in the effective region AA, and a plurality of signal lines SL1_1a to SL1_4a, SL1_1b to SL1_4b, and SL2-1 to SL2_6 in the non-effective region NAA adjacent to the effective region AA, and electrically connected to the sensing electrodes SE1_1 to SE1_4 and SE2_1 to SE2_6.

According to some embodiments, the sensing electrode SE1_1 to SE1_4 and SE2_1 to SE2_6 include transmission electrodes SE1_1 to SE1_4, and reception electrodes SE2_1 to SE2_6.

The signal lines to SL1_4a, SL1_1b to SL1_4b, and SL2-1 to SL2_6 may include transmission signal lines to SL1_4a and SL1_1b to SL1_4b connected to the transmission electrodes SE1_1 to SE1_4. According to various examples of the present disclosure, the transmission signal lines SL1_1a to SL1_4a and SL1_1b to SL1_4b may include first transmission signal lines SL1_1a to SL1_4a respectively connected to a first end of the transmission electrodes SE1_1 to SE1_4, and second transmission signal lines SL1_1b to SL1_4b respectively connected to a second end of the transmission electrodes SE1_1 to SE1_4. According to some embodiments of the present disclosure, the first end of the transmission electrodes SE1_1 to SE1_4 refers to the end that is relatively closer to input pads I-PD (which will be described later) than the second end of the transmission electrodes SE1_1 to SE1_4; and the second end of the transmission electrodes SE1_1 to SE1_4 refers to the end that is relatively farther from the input pads I-PD than the first end of the transmission electrodes SE1_1 to SE1_4.

In addition, the signal lines SL1_1a to SL1_4a, SL1_1b to SL1_4b, and SL2-1 to SL2_6 may include reception signal lines SL2_1 to SL2_6 respectively connected to a first end of the reception electrodes SE2_1 to SE2_6. According to an example of the present disclosure, the input sensing layer ISP may further include reception signal lines respectively connected to a second end of the reception electrodes SE2_1 to SE2_6.

In some embodiments, the transmission electrodes SE1_1 to SE1_4 and the reception electrodes SE2_1 to SE2_6 cross each other. The transmission electrodes SE1_1 to SE1_4 are arranged in the second direction DR2, and each of the transmission electrodes SE1_1 to SE1_4 extends in the first direction DR1. The reception electrodes SE2_1 to SE2_6 are arranged in the first direction DR1, and each of the reception electrodes SE2_1 to SE2_6 extends in the second direction DR2.

The above-described input sensing layer ISP may obtain coordinate information in a mutual capacitance mode. Between the transmission electrodes SE1_1 to SE1_4 and the reception electrodes SE2_1 to SE2_6, a capacitance may be formed. The capacitance between the transmission electrodes SE1_1 to SE1_4 and the reception electrodes SE2_1 to SE2_6 may be changed by the first input TC1 (see FIG. 1) or the second input TC2 (see FIG. 1). Here, the sensing sensitivity of the input sensing layer ISP may be determined in accordance with the amount of change in the capacitance. That is, the larger the amount of the change in the capacitance by the first input TC1 or the second input TC2, the better the sensing sensitivity of the input sensing layer ISP.

In some embodiments, each of the transmission electrodes SE1_1 to SE1_4 includes first sensor parts SP1 and first connection parts CP1 in the effective region AA. Each of the reception electrodes SE2_1 to SE2_6 includes second sensor parts SP2 and second connection parts CP2 in the effective region AA.

In FIG. 6, the transmission electrodes SE1_1 to SE1_4 and the reception electrodes SE2_1 to SE2_6 according to some embodiments are illustrated, but the shapes thereof are not limited thereto. According to some embodiments of the present disclosure, the transmission electrodes SE1_1 to SE1_4 and the reception electrodes SE2_1 to SE2_6 may have a shape in which a sensor unit and a connection unit are not distinguished from each other (for example, a bar shape). In some embodiments, the first sensor parts SP1 and the second sensor parts SP2 having a lozenge shape are illustrated, but the embodiments of the present disclosure are not limited thereto. The first sensor parts SP1 and the second sensor parts SP2 may have polygonal shapes different from each other.

According to some embodiments of the present disclosure, in one transmission electrode, the first sensor parts SP1 may be arranged along the first direction DR1, and in one reception electrode, the second sensor parts SP2 may be arranged along the second direction DR2. Each of the first connection parts CP1 connects respective ones of the first sensor parts SP1 that are adjacent to each other, and each of the second connection parts CP2 connects respective ones of the second sensor parts SP2 that are adjacent to each other.

Each of the transmission electrodes SE1_1 to SE1_4 and each of the reception electrodes SE2_1 to SE2_6 may have a mesh shape. Because each of the transmission electrodes SE1_1 to SE1_4 and each of the reception electrodes SE2_1 to SE2_6 have a mesh shape, a parasitic capacitance with electrodes of the display panel DP (see, FIG. 2) may be reduced.

The transmission electrodes SE1_1 to SE1_4 and the reception electrodes SE2_1 to SE2_6 having a mesh shape may include silver, aluminum, copper, chromium, nickel, titanium, or the like, but the embodiments of the present disclosure are not limited thereto.

The first and second transmission signal lines to SL1_4a and SL1_1b to SL1_4b and the reception signal lines SL2_1 to SL2_6 may be in the non-effective region NAA.

The input sensing layer ISP may include the input pads I-PD extended from one end of the first and second transmission signal lines to SL1_4a and SL1_1b to SL1_4b and from the reception signal lines SL2_1 to SL2_6, and located in the non-effective region NAA. The input pads I-PD may be electrically connected to the first and second transmission signal lines SL1_1a to SL1_4a and to SL1_4b and the reception signal lines SL2_1 to SL2_6. According to some embodiments of the present disclosure, the input pads I-PD include a first transmission input pad T-PD1 to which the first transmission signal lines to SL1_4a are electrically connected, and a second transmission signal input pad T-PD2 to which the second transmission signal lines SL1_1b to SL1_4b are electrically connected. The input pads I-PD may further include a reception input pad R-PD to which the reception signal lines SL2_1 to SL2_6 are electrically connected.

According to some embodiments of the present disclosure, the non-effective region NAA may include a first region NAA1, a second region NAA2, a third region NAA3, and a pad region PLD in which the input pads I-PD are located.

The first region NAA1 may be a region adjacent to the effective region AA. The second region NAA2 may be a region adjacent to the pad region PLD. The third region NAA3 may be a region adjacent to the first region NAA1 and to the second region NAA2. According to some embodiments of the present disclosure, the third region NAA3 may be located between the first region NAA1 and the second region NAA2.

As an example of the present disclosure, each of the first and second transmission signal lines SL1_1a to SL1_4a and SL1_1b to SL1_4b and each of the reception signal lines SL2_1 to SL2_6 may include first sub-lines SSL1, second sub-lines SSL2, and third sub-lines SSL3.

In some embodiments, among the first and second transmission signal lines SL1_1a to SL1_4a and SL1_1b to SL1_4b and the reception signal lines SL2_1 to SL2_6, the first sub-lines SSL1 may be a portion electrically connected to the transmission electrodes SE1_1 to SE1_4 and the reception electrodes SE2_1 to SE2_6. Among the first and second transmission signal lines to SL1_4a and SL1_1b to SL1_4b and the reception signal lines SL2_1 to SL2_6, the first sub-lines SSL1 may be a portion located in the first region NAA1. Each of the first sub-lines SSL1 may include a portion directly coupled to a corresponding electrode among the transmission electrodes SE1_1 to SE1_4 and the reception electrodes SE2_1 to SE2_6.

Among the first and second transmission signal lines to SL1_4a and SL1_1b to SL1_4b and the reception signal lines SL2_1 to SL2_6, the second sub-lines SSL2 may be a portion electrically connected to the input pads I-PD. Among the first and second transmission signal lines SL1_1a to SL1_4a and SL1_1b to SL1_4b and the reception signal lines SL2_1 to SL2_6, the second sub-lines SSL2 may be a portion located in the second region NAA2. Each of the second sub-lines SSL2 may include a portion directly coupled to a corresponding input pad among the input pads I-PD.

The third sub-lines SSL3 may be a portion electrically connecting the first sub-lines SSL1 and the second sub-lines SSL2. Among the first and second transmission signal lines SL1_1a to SL1_4a and SL1_1b to SL1_4b and the reception signal lines SL2_1 to SL2_6, the third sub-lines SSL3 may be a portion located in the third region NAA3. In some embodiments, one end of each of the third sub-lines SSL3 is electrically connected to a corresponding first sub-line, and the other end of the third sub-lines SSL3 is electrically connected to a corresponding second sub-line. Each of the third sub-lines SSL3 may have an integral shape with a corresponding first sub-line and a corresponding second sub-line.

Referring to FIG. 6 to FIG. 7B, an interval(s) between the first sub-lines SSL1 in the first region NAA1 may be referred to as a first interval w1. The first interval w1 may include a first sub-interval w1_a and a second sub-interval w1_b. The first sub-interval w1_a may be defined as an interval in the second direction DR2 between portions extended in the first direction DR1 among the first sub-lines SSL1. The second sub-interval w1_b may be defined as an interval in the first direction DR1 between portions extended in the second direction DR2 among the first sub-lines SSL1. The second sub-interval w1_b may be smaller than the first sub-interval w1_a.

In addition, an interval(s) between the second sub-lines SSL2 in the second region NAA2 may be referred to as a second interval w2. An interval(s) between the third sub-lines SSL3 in the third region NAA3 may be referred to as a third interval w3. According to some embodiments of the present disclosure, the third interval w3 may be smaller than the first and second intervals w1 and w2. According to other embodiments of the present disclosure, the third interval w3 may be smaller than the second sub-interval w1_b and the second interval w2.

In some embodiments, when the input pads I-PD are arranged in the first direction DR1, the second sub-lines SSL2, which are electrically connected to the input pads I-PD, are extended in a direction crossing the first direction DR1 in the second region NAA2. According to some embodiments of the present disclosure, the second sub-lines SSL2 may be extended in the second direction DR2 orthogonal to the first direction DR1. However, the present disclosure is not limited thereto. That is, the second sub-lines SSL2 may be extended in a direction inclined with respect to the first direction DR1 and the second direction DR2.

The third sub-lines SSL3 respectively electrically connected to the second sub-lines SSL2 may have the third interval w3, which is smaller than the second interval w2, in the third region NAA3. Each of the third sub-lines SSL3 may include a step shape. Each of the third sub-lines SSL3 may include a portion extended in the first direction DR1 (hereinafter, "horizontal portion") and a portion extended in the second direction DR2 (hereinafter, "vertical portion"). Each of the third sub-lines SSL3 may include the horizontal portion having a small interval with each of the third sub-lines SSL3. The third interval w3 may include a third sub-interval w3_a and a fourth sub-interval w3_b. The third sub-interval w3_a is defined as an interval in the second direction DR2 between the horizontal portions among the third sub-lines SSL3. The fourth sub-interval w3_b is defined as an interval in the first direction DR1 between the vertical portions among the third sub-lines SSL3. The third sub-interval w3_a and the fourth sub-interval w3_b may be smaller than the first interval w1 and the second interval w2. According to some embodiments of the present disclosure, the length of the horizontal portion of each of the third sub-lines SSL3 may be different from each other such the third sub-interval w3_a and the fourth sub-interval w3_b are smaller than the first interval w1 and the second interval w2.

Each of the third sub-lines SSL3 may include a shape in which the horizontal portions and the vertical portions are repeated, and are in the third region NAA3 such that the third interval w3 is maintained. According to some embodiments of the present disclosure, the third sub-lines SSL3 may be such that the third sub-interval w3_a and the fourth sub-interval w3_b are maintained substantially constant.

In addition, according to some embodiments of the present disclosure, each of the third sub-lines SSL3 may include a shape extended in a fourth direction DR4 or a fifth direction DR5 crossing the first direction DR1. Each of the third sub-lines SSL3 may include the shape (e.g., one or more portions) extended in the fourth direction DR4 or the fifth direction DR5 to have a small interval with each of adjacent third sub-lines SSL3.

The first sub-lines SSL1 electrically connected to the third sub-lines SSL3 may have the first interval w1 in the first region NAA1 to be electrically connected to the transmission electrodes SE1_1 to SE1_4 and to the reception electrodes SE2_1 to SE2_6. According to some embodiments of the present disclosure, the first interval w1 may be larger than the third interval w3. However, the present disclosure are not limited thereto. The first sub-interval w1_a of the first interval w1 may be larger than the third interval w3, and the second sub-interval w1_b of the first interval w1 may be equal to or larger than the third w3.

In some embodiments, on the basis of the first input TC1 (see FIG. 1) or the second input TC2 (see FIG. 1) provided to the effective region AA in which the transmission electrodes SE1_1 to SE1_4 and the reception electrodes SE2_1 to SE2_6 are arranged, the input sensing layer ISP calculates coordinate information of the first input TC1 or the second input TC2.

When the input sensing layer ISP performs an operation of sensing the second input TC2, if an interval between the first and second transmission signal lines SL1_1a to SL1_4a and SL1_1b to SL1_4b and the reception signal lines SL2_1 to SL2_6 in the third region NAA3 in the non-effective region NAA is large, changes in parasitic capacitance between adjacent lines caused by the second input TC2 provided to the third region NAA3 are sensed by the input sensing layer ISP. In the case of the third region NAA3, the first and second transmission signal lines SL1_1a to SL1_4a and SL1_1b to SL1_4b and the reception signal lines SL2_1 to SL2_6 are densely arranged in a region that is smaller than the first region NAA1, so that changes in parasitic capacitance between adjacent lines caused by the second input TC2 are sensed by the input sensing layer ISP. For example, if an interval between the first and second transmission signal lines SL1_1a to SL1_4a and SL1_1b to SL1_4b and the reception signal lines SL2_1 to SL2_6 in the dense third region NAA3 is large enough to allow an input signal by the second input TC2 to be positioned between two adjacent lines, changes in parasitic capacitance caused by the second input TC2 may be sensed by the input sensing layer ISP. In this case, the input sensing layer ISP may misrecognize that the second input TC2 provided to the third region NAA3 is provided to the effective region AA. Therefore, a ghost touch phenomenon may occur wherein the input sensing layer ISP misrecognizes that coordinate information of the second input TC2 is in the effective region AA, and the display device DD (see FIG. 1) and the electronic device ED (see FIG. 1) may malfunction due to the misrecognized coordinate information.

However, according to various embodiments of the present disclosure, in the third region NAA3 of the non-effective region NAA, excluding the second region NAA2 adjacent to the pad region PLD and the first region NAA1 adjacent to the effective region AA, an interval between the first and second transmission signal lines SL1_1a to SL1_4a and SL1_1b to SL1_4b and the reception signal lines SL2_1 to SL2_6 may be small. When an interval between two adjacent lines is small, an input signal by the second input TC2 may be positioned by overlapping a plurality of lines. In this case, changes in parasitic capacitance between adjacent lines caused by the second input TC2 provided to the third region NAA3 may not be sensed by the input sensing layer ISP. Therefore, it is possible to reduce (e.g., prevent) the above-described ghost touch phenomenon from occurring, and accordingly, it is possible to reduce (e.g., prevent) the display device DD and the electronic device ED from malfunctioning.

The input sensing layer ISP may further include ground lines GNL1 and GNL2 between the first and second transmission signal lines SL1_1a to SL1_4a and SL1_1b to SL1_4b and the reception signal lines SL2_1 to SL2_6, and to which a ground power source is applied.

According to some embodiments of the present disclosure, the input pads I-PD may further include ground pads GPD1 and GPD2 to which the ground lines GNL1 and GNL2 are electrically connected. A ground power may be applied to the ground pads GPD1 and GPD2 to connect the ground power to the ground lines GNL1 and GNL2.

By arranging the ground lines GNL1 and GNL2 between the first and second transmission signal lines to SL1_4a and to SL1_4b and the reception signal lines SL2_1 to SL2_6, a coupling phenomenon and the like occurring between the first and second transmission signal lines SL1_1a to SL1_4a and SL1_1b to SL1_4b and the reception signal lines SL2_1 to SL2_6 may be reduced (e.g., prevented) to increase the sensing sensitivity of the input sensing layer ISP.

According to some embodiments of the present disclosure, the input sensing layer ISP may further include a dummy electrode DE between the first and second transmission signal lines to SL1_4a and to SL1_4b and the reception signal lines SL2_1 to SL2_6. The dummy electrode DE may include a plurality of sub-dummy electrodes SDE.

According to some embodiments of the present disclosure, by allowing an interval between each of the first and second transmission signal lines to SL1_4a and SL1_1b to SL1_4b and an interval between each of the reception signal lines SL2_1 to SL2_6 on the input sensing layer ISP to be constant, it is possible to reduce or prevent visibility of the first and second transmission signal lines to SL1_4a and SL1_1b to SL1_4b and the reception signal lines SL2_1 to SL2_6 from the outside. Therefore, the first transmission signal lines SL1_1a to SL1_4a may be adjacent to each other, the second transmission signal lines SL1_1b to SL1_4b may be adjacent to each other, and the reception signal lines SL2_1 to SL2_6 may be adjacent to each other.

When the first and second transmission signal lines to SL1_4a and SL1_1b to SL1_4b and the reception signal lines SL2_1 to SL2_6 are arranged such that the third interval w3 is smaller than the first and second intervals w1 and w2, there may be a separation space generated between the first and second transmission signal lines SL1_1a to SL1_4a and SL1_1b to SL1_4b and the reception signal lines SL2_1 to SL2_6, so that the separation space may be visually recognized from the outside.

Therefore, the dummy electrode DE including the plurality of sub-dummy electrodes SDE may be arranged in the separation space to reduce or prevent visibility of the separation space from the outside.

In some embodiments, the sub-dummy electrodes SDE are separated from each other, and when an interval between two adjacent sub-dummy electrodes among the plurality of sub-dummy electrodes SDE is a fourth interval w4, the fourth interval w4 may be substantially the same as the third interval w3. In this case, it is possible to reduce or prevent visibility of a separation space from the outside. However, in some embodiments, the sub-dummy electrodes SDE may include another interval other than the fourth interval w4. In addition, as shown in FIG. 7A, the sub-dummy electrodes SDE are spaced apart both in the first direction DR1 and the second direction DR2. In some embodiments, the sub-dummy electrodes SDE may be spaced apart in one direction (e.g., the first direction DR1 or the second direction DR2), and extend in the other direction thereof.

Referring to FIG. 6, the input pads I-PD may be arranged at a lower right end of the input sensing layer ISP with respect to the first and second directions DR1 and DR2. The first transmission input pad T-PD1 is located on the right side in the input pads I-PD, and the first transmission signal lines SL1_1a to SL1_4a electrically connecting the first end of the transmission electrodes SE1_1 to SE1_4 and the first transmission input pad T-PD1 include a shape (e.g., a portion) that extends in the first direction DR1 and a shape that extends in the second direction DR2.

The second transmission input pad T-PD2 is located on the left side in the input pads I-PD, and the second transmission signal lines SL1_1b to SL1_4b electrically connecting the second end of the transmission electrodes SE1_1 to SE1_4 and the first second transmission input pad T-PD2 include a shape that extends in an opposite direction to the first direction DR1 and a shape that extends in the second direction DR2.

The reception input pad R-PD may be between the first transmission input pad T-PD1 and the second transmission input pad T-PD2. The reception signal lines SL2_1 to SL2_6 may be arranged such that the third interval w3 is maintained between two adjacent reception signal lines among the reception signal lines SL2_1 to SL2_6. According to some embodiments of the present disclosure, a first reception signal line SL2_1 electrically connecting a first reception electrode SE2_1 that is the farthest from the reception input pad R-PD and the reception input pad R-PD includes a shape that extends in the opposite direction to the first direction DR1 and a shape that extends in the second direction DR2.

A first ground line GNL1 may be between the second transmission signal lines SL1_1b to SL1_4b and the reception signal lines SL2_1 to SL2_6.

Between the reception signal lines SL2_1 to SL2_6 and the first transmission signal lines SL1_1a to SL1_4a is the dummy electrode DE, and a second ground line GNL2 may surround the dummy electrode DE.

The input pads I-PD may include a first ground pad GPD1 between the second transmission input pad T-PD2 and the reception input pad R-PD, and a second ground pad GPD2 between the reception input pad R-PD and the first transmission input pad T-PD1.

Figure 8A:
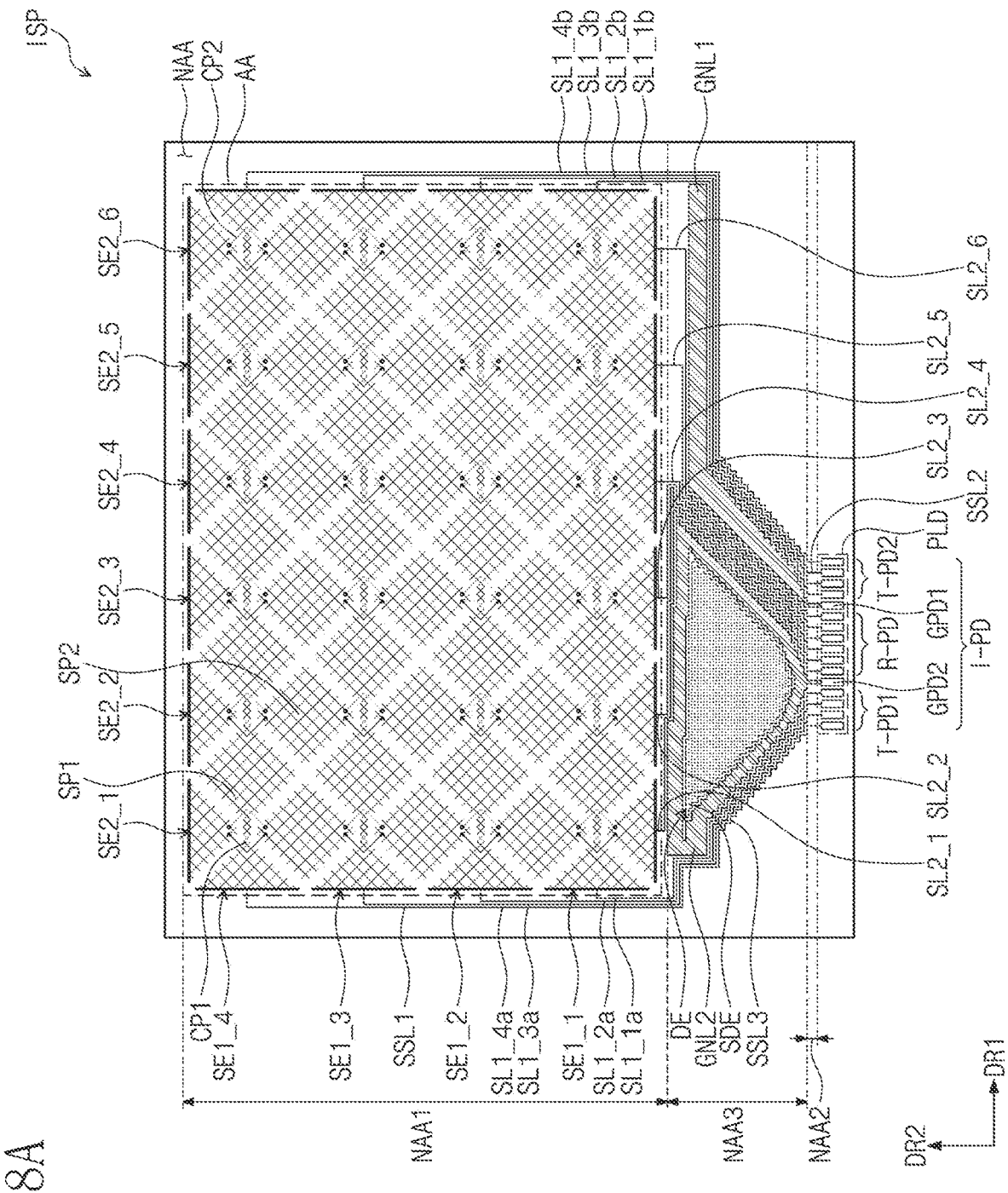
FIG. 8A to FIG. 8C are plan views showing the configuration of an input sensing layer according to some embodiments of the present disclosure.
Figure 8B:
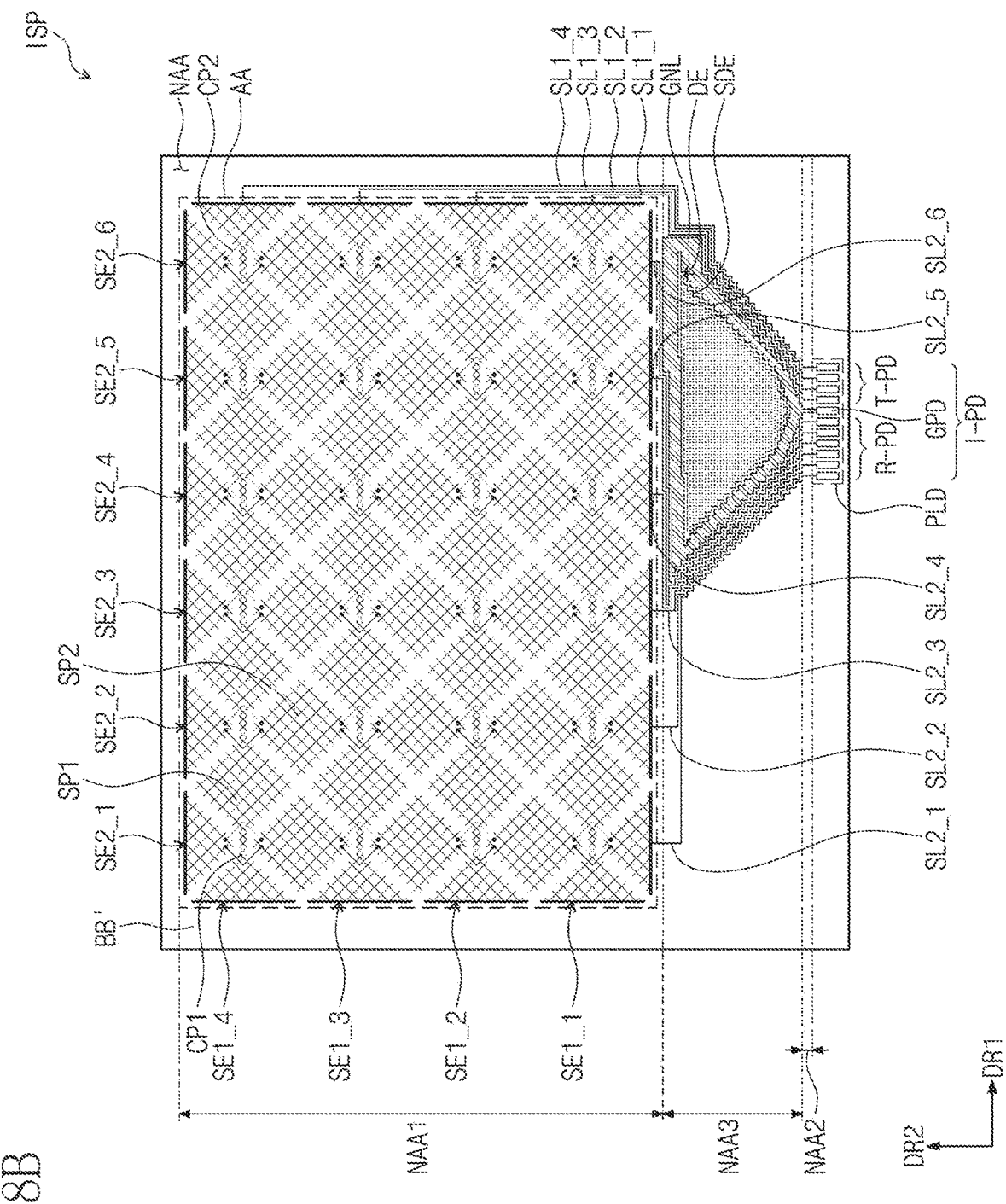
Figure 8C:
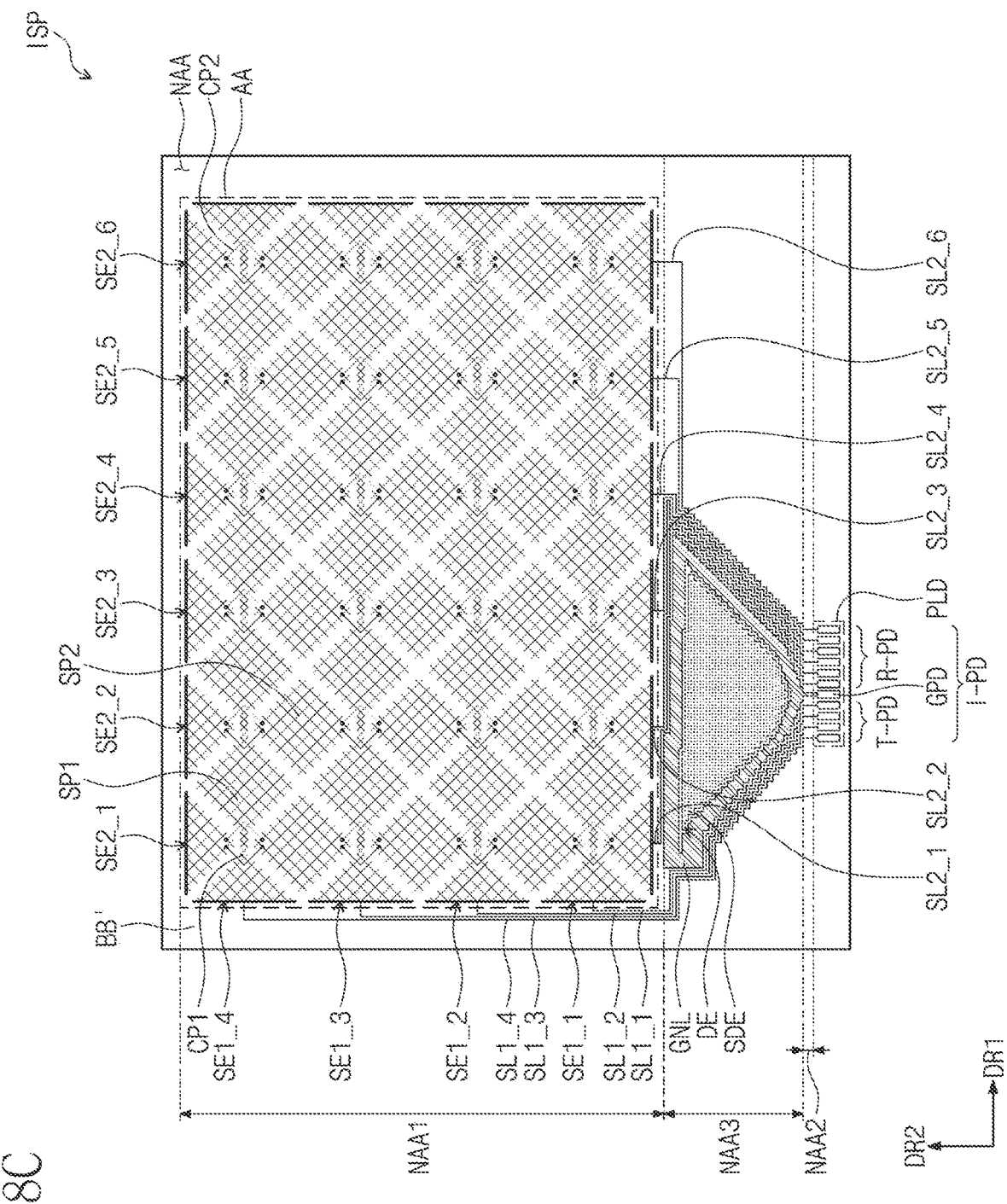

FIG. 8A to FIG. 8C are plan views showing the configuration of an input sensing layer according to some embodiments of the present disclosure. Hereinafter, the same reference numerals are given to the same components as those described with reference to FIG. 6 to FIG. 7B, and redundant descriptions thereof are omitted.

Referring to FIG. 8A, the input pads I-PD may be arranged at a lower left end of the input sensing layer ISP. The first transmission input pad T-PD1 is located on the left side in the input pads I-PD, and the first transmission signal lines SL1_1a to SL1_4a electrically connecting the first end of the transmission electrodes SE1_1 to SE1_4 and the first transmission input pad T-PD1 include a shape that extends in the opposite direction to the first direction DR1 and a shape that extends in the second direction DR2.

The second transmission input pad T-PD2 is arranged on the right side in the input pads I-PD, and the second transmission signal lines SL1_1b to SL1_4b electrically connecting the second end of the transmission electrodes SE1_1 to SE1_4 and the first second transmission input pad T-PD2 include a shape that extends in the first direction DR1 and a shape that extends in the second direction DR2.

The reception input pad R-PD may be between the first transmission input pad T-PD1 and the second transmission input pad T-PD2. The reception signal lines SL2_1 to SL2_6 may be arranged such that the third interval w3 is maintained between two adjacent reception signal lines among the reception signal lines SL2_1 to SL2_6. For example, a sixth reception signal line SL2_6 electrically connecting a sixth reception electrode SE2_6, which is farthest from the reception input pad R-PD of the reception signal lines SL2_1 to SL2_6, and the reception input pad R-PD include a shape that extends in the first direction DR1 and a shape that extends in the second direction DR2.

A first ground line GNL1 may be between the second transmission signal lines SL1_1b to SL1_4b and the reception signal lines SL2_1 to SL2_6.

Between the reception signal lines SL2_1 to SL2_6 and the first transmission signal lines SL1_1a to SL1_4a is the dummy electrode DE, and a second ground line GNL2 may surround the dummy electrode DE.

The input pads I-PD may include a first ground pad GPD1 between the second transmission input pad T-PD2 and the reception input pad R-PD, and a second ground pad GPD2 between the reception input pad R-PD and the first transmission input pad T-PD1.

Referring to FIG. 8B, signal lines SL1_1 to SL1_4 and SL2_1 to SL2_6 of the input sensing layer ISP may include transmission signal lines SL1_1 to SL1_4 and the reception signal lines SL2_1 to SL2_6 respectively connected to the first end of the transmission electrodes SE1_1 to SE1_4.

The input pads I-PD may be arranged at a lower right end of the input sensing layer ISP. A transmission input pad T-PD is arranged on the right side in the input pads I-PD, and the transmission signal lines SL1_1 to SL1_4 electrically connecting the first end of the transmission electrodes SE1_1 to SE1_4 and the transmission input pad T-PD include a shape that extends in the first direction DR1 and a shape that extends in the second direction DR2.

The reception input pad R-PD may be on the left side of the transmission input pad T-PD. The reception signal lines SL2_1 to SL2_6 may be such that the third interval w3 is maintained between two adjacent reception signal lines among the reception signal lines SL2_1 to SL2_6. For example, a first reception signal line SL2_1 electrically connecting a first reception electrode SE2_1, which is farthest from the reception input pad R-PD among the reception signal lines SL2_1 to SL2_6, and the reception input pad R-PD include a shape that extends in the opposite direction to the first direction DR1 and a shape that extends in the second direction DR2.

Between the reception signal lines SL2_1 to SL2_6 and the transmission signal lines SL1_1 to SL1_4 is the dummy electrode DE, and a ground line GNL may surround the dummy electrode DE.

The input pads I-PD may include a ground pad GPD between the transmission input pad T-PD and the reception input pad R-PD.

Referring to FIG. 8C, the input pads I-PD may be at a lower left end of the input sensing layer ISP. A transmission input pad T-PD is on the left side in the input pads I-PD, and the transmission signal lines SL1_1 to SL1_4 electrically connecting the first end of the transmission electrodes SE1_1 to SE1_4 and the transmission input pad T-PD include a shape that extends in the opposite direction to the first direction DR1 and a shape that extends in the second direction DR2.

The reception input pad R-PD may be on the right side of the transmission input pad T-PD. The reception signal lines SL2_1 to SL2_6 may be arranged such that the third interval w3 is maintained between two adjacent reception signal lines among the reception signal lines SL2_1 to SL2_6. For example, a sixth reception signal line SL2_6 electrically connecting a sixth reception electrode SE2_6, which is farthest from the reception input pad R-PD among the reception signal lines SL2_1 to SL2_6, and the reception input pad R-PD include a shape that extends in the first direction DR1 and a shape that extends in the second direction DR2.

Between the reception signal lines SL2_1 to SL2_6 and the transmission signal lines SL1_1 to SL1_4 is the dummy electrode DE, and a ground line GNL may surround the dummy electrode DE.

The input pads I-PD may include a ground pad GPD between the transmission input pad T-PD and the reception input pad R-PD.

Figure 9:
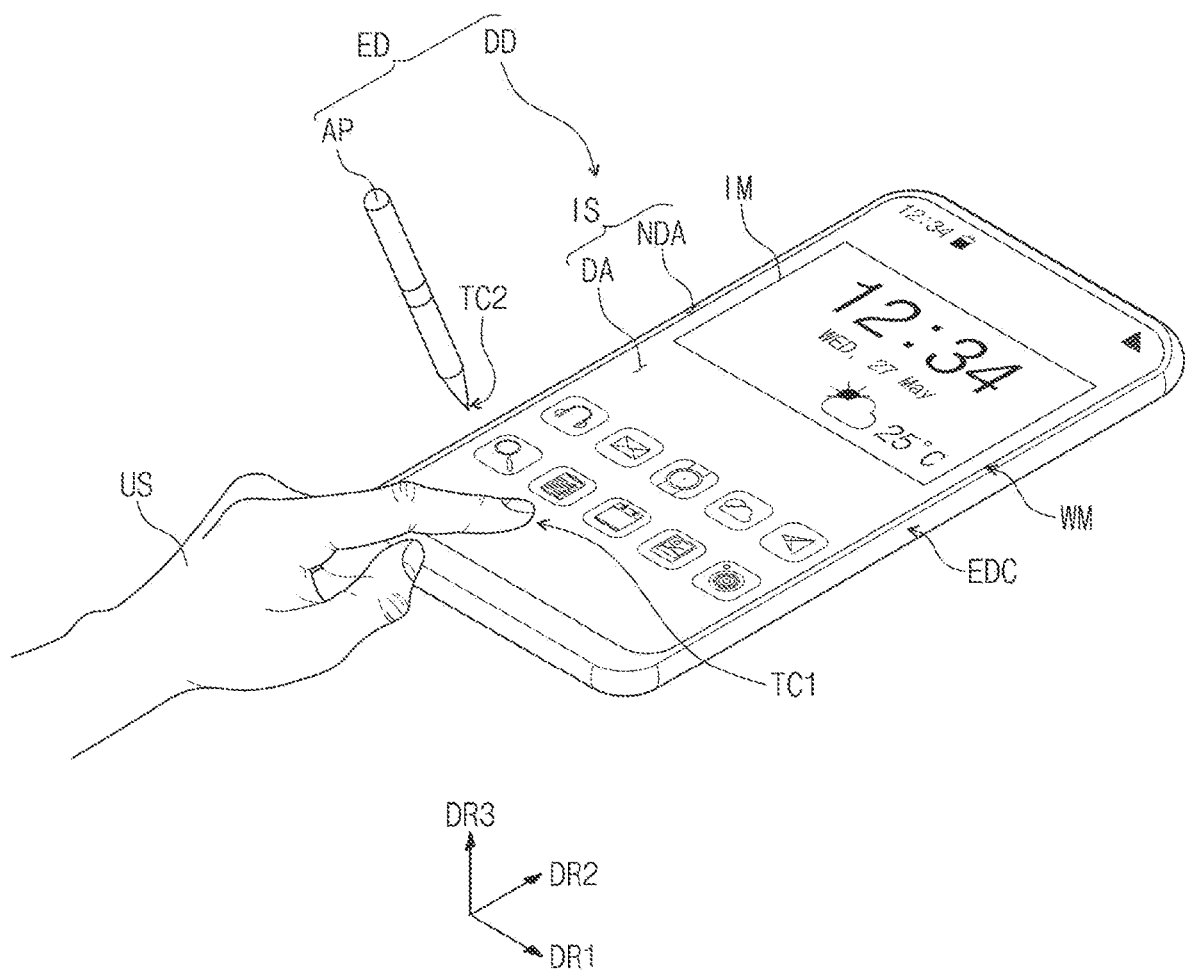
FIG. 9 is a perspective view of an electronic device according to some embodiments of the present disclosure.
Figure 10:
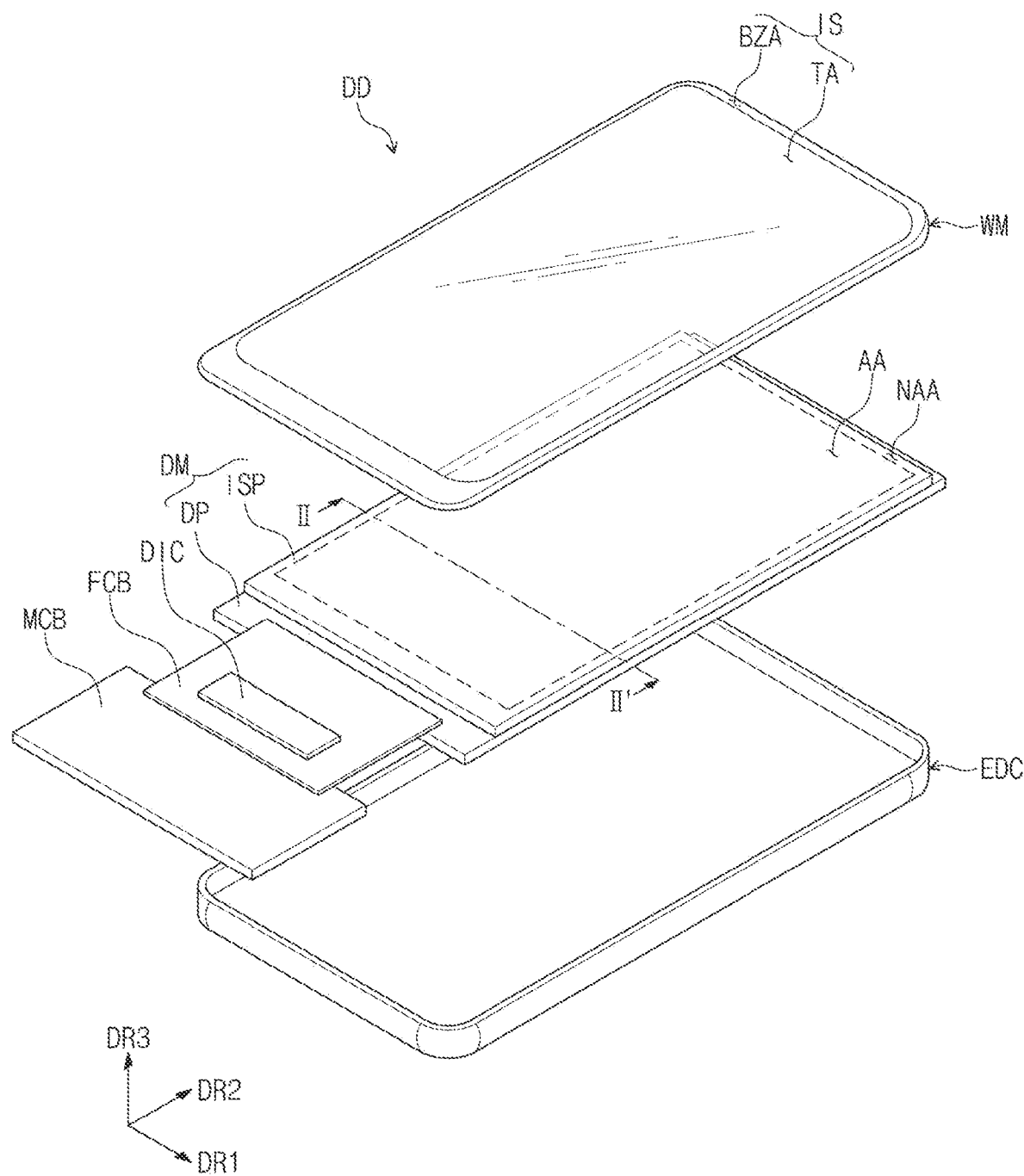
FIG. 10 is an exploded perspective view of a display device illustrated in FIG. 9.
Figure 11:
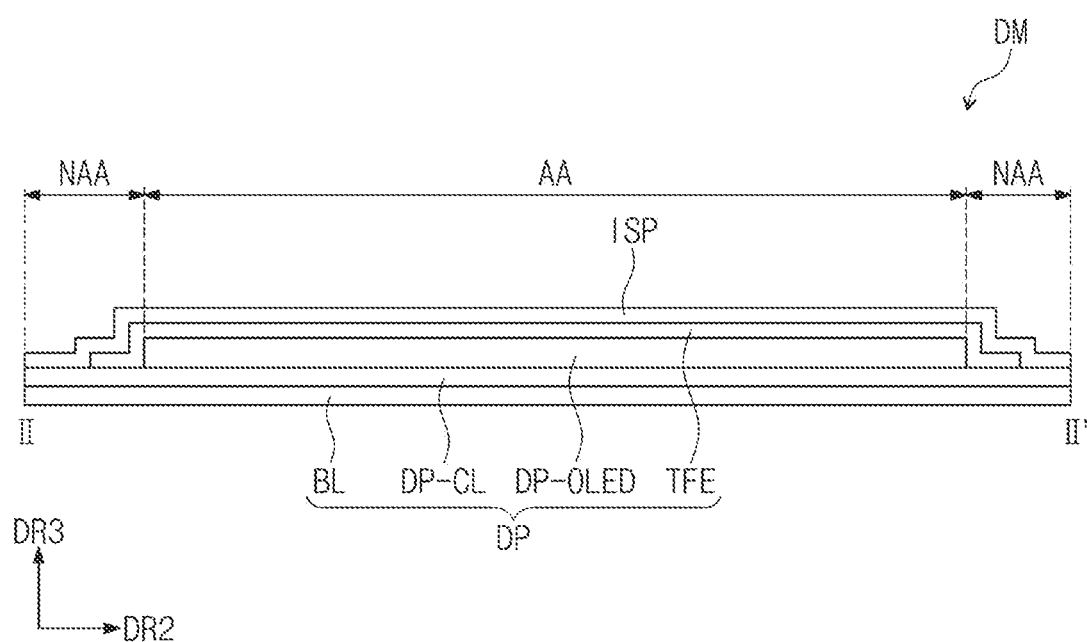
FIG. 11 is a cross-sectional view of the display module DM taken along the line II-II' illustrated in FIG. 10.

FIG. 9 is a perspective view of an electronic device according to some embodiments of the present disclosure, and FIG. 10 is an exploded perspective view of a display device illustrated in FIG. 9. FIG. 11 is a cross-sectional view of the display module DM taken along the line II-II' illustrated in FIG. 10. Hereinafter, the same reference numerals are given to the same components as those described with reference to FIG. 1 to FIG. 3, and redundant descriptions thereof are omitted.

Referring to FIG. 9 to FIG. 11, the display device DD having a mobile phone shape is illustrated. In FIG. 9 and FIG. 10, the display device DD is illustrated as having a flat structure, but the embodiments of the present disclosure are not limited thereto. The display device DD may be bent or folded along a folding axis, and may also have a slidable display structure.

In some embodiments, the display module DM included in the display device DD includes the display panel DP and the input sensing panel ISP. The display module DM may further include the main circuit board MCB, the flexible circuit film FCB, and the driving chip DIC. The main circuit board MCB may be connected to the flexible circuit film FCB to be electrically connected to the display panel DP. The flexible circuit film FCB is connected to the display panel DP to electrically connect the display panel DP and the main circuit board MCB. The input sensor ISP may also be electrically connected to the main circuit board MCB through the flexible circuit film FCB. However, the embodiments of the present disclosure are not limited thereto. That is, the display module DM may additionally include a separate flexible circuit film for electrically connecting the input sensing layer ISP to the main circuit board MCB.

The main circuit board MCB may include a plurality of driving elements. On the flexible circuit film FCB, the driving chip DIC maybe mounted. However, the embodiments of the present disclosure are not limited thereto. For example, the driving chip DIC may be directly on the display panel DP. In this case, a portion of the display panel DP in which the driving chip DIC is mounted may be bent and located on a back surface of the display module DM. The driving chip DIC may include driving elements for driving pixels of the display panel DP, for example, a data driving circuit.

The display module DM may further include a controller for controlling the driving of the input sensing layer ISP. That is, the controller may be mounted on the main circuit board MCB. However, according to other embodiments, the controller may be embedded in the driving chip DIC.

The display panel DP may include the base layer BL, the circuit element layer DP-CL on the base layer BL, the display element layer DP-OLED, and the thin film encapsulation layer TFE.

The base layer BL may include at least one plastic film. The base layer BL is a flexible substrate, and may include, for example, a plastic substrate, a glass substrate, a metal substrate, or an organic/inorganic composite material substrate, and the like. The effective region AA and the non-effective region NAA described with reference to FIG. 1 may be equally defined on the base layer BL.

The display element layer DP-OLED may be on the circuit element layer DP-CL, and may include a light emitting element. The light emitting element may include at least organic light emitting diodes.

In some embodiments, the encapsulation layer TFE encapsulates the display element layer DP-OLED. The encapsulation layer TFE includes at least one inorganic layer. The encapsulation layer TFE may further include at least one organic layer. The inorganic layer protects the display element layer DP-OLED from moisture/oxygen, and the organic layer protects the display element layer DP-OLED from foreign materials such as dust particles. The inorganic layer may include, for example, a silicon nitride layer, a silicon oxynitride layer, a silicon oxide layer, a titanium oxide layer, an aluminum oxide layer, or the like. The organic layer may include an acrylic organic layer, but the embodiments of the present disclosure are not limited thereto.

In some embodiments, the input sensing layer ISP may be formed on the display panel DP by a continuous process. In addition, the input sensing layer ISP and the display panel DP may be bonded to each other through an adhesive film. The input sensing layer ISP may have a multi-layered structure. The input sensing layer ISP may include a single-layered or a multi-layered insulation layer. According to some embodiments of the present disclosure, when the input sensing layer ISP is directly on the display panel DP by a continuous process, the input sensing layer ISP is directly on the encapsulation layer TFE, and there is no adhesive film between the input sensing layer ISP and the display panel DP. However, according to other embodiments, an adhesive film may be present between the input sensing layer ISP and the display panel DP. In this case, the input sensing layer ISP is not manufactured by a continuous process with the display panel DP, but may be manufactured through a separate process from the display panel DP, and then fixed on an upper surface of the display panel DP by an adhesive film.

Figure 12:
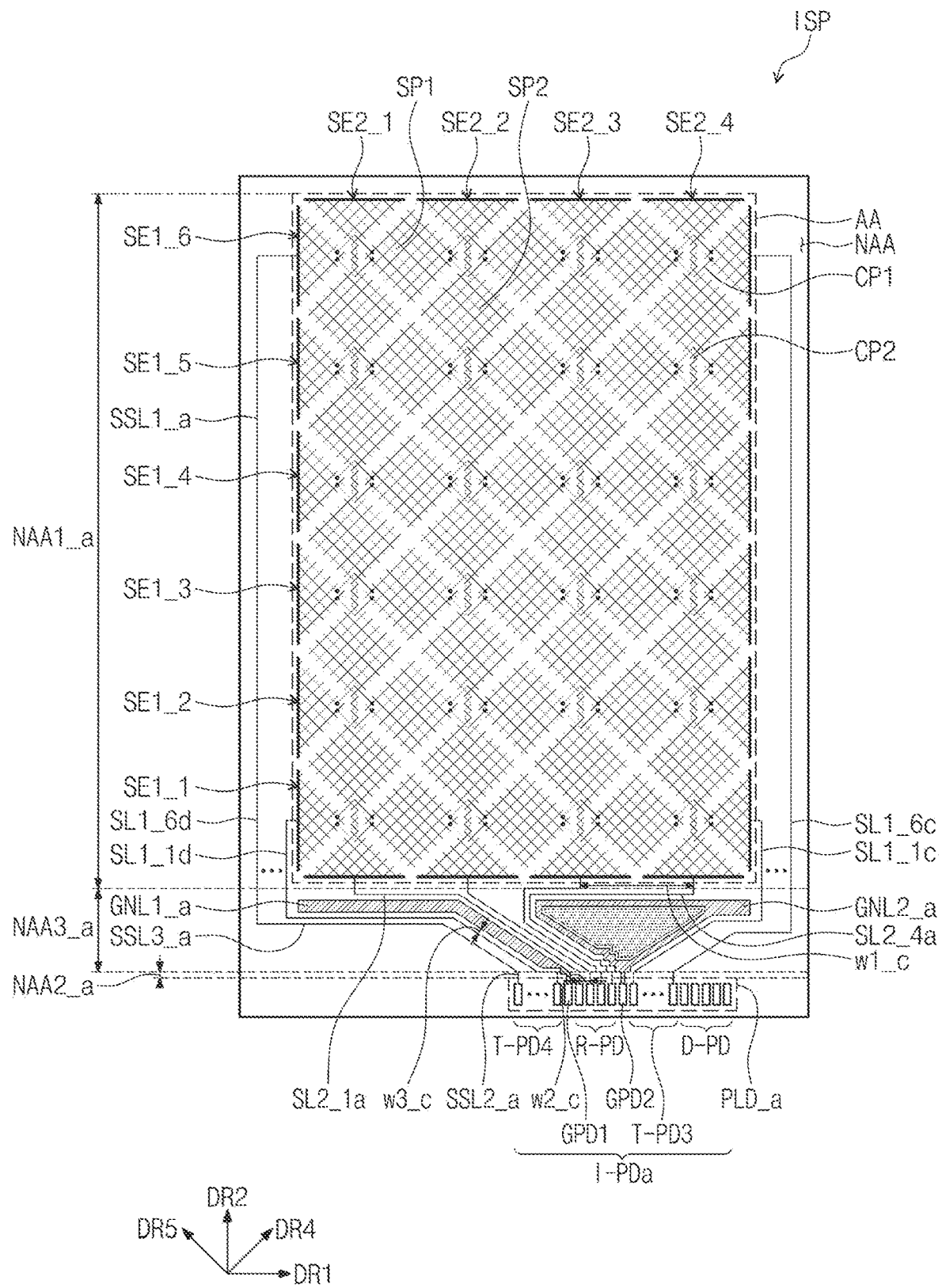
FIG. 12 is a plan view illustrating the configuration of an input sensing layer illustrated in FIG. 10.

FIG. 12 is a plan view illustrating the configuration of an input sensing layer illustrated in FIG. 10. Hereinafter, the same reference numerals are given to the same components as those described with reference to FIG. 6 to FIG. 8C, and redundant descriptions thereof are omitted.

Referring to FIG. 12, the input sensing layer ISP according to some embodiments of the present disclosure may include the plurality of sensing electrodes SE1_1 to SE1_6 and SE2_1 to SE2_4 in the effective region AA, and the plurality of signal lines SL1_1c to SL1_6c, SL1_1d to SL1_6d, and SL2_1a to SL2_4a in the non-effective region NAA adjacent to the effective region AA and electrically connected to the sensing electrodes SE1_1 to SE1_6 and SE2_1 to SE2_4.

According to some embodiments of the present disclosure, the sensing electrode SE1_1 to SE1_6 and SE2_1 to SE2_4 include the transmission electrodes SE1_1 to SE1_6, and the reception electrodes SE2_1 to SE2_4.

The signal lines SL1_1c to SL1_6c, SL1_1d to SL1_6d, and SL2_1a to SL2_4a may include the transmission signal lines SL1_1c to SL1_6c and SL1_1d to SL1_6d connected to the transmission electrodes SE1_1 to SE1_6. For example, the transmission signal lines SL1_1c to SL1_6c and SL1_1d to SL1_6d may include the first transmission signal lines SL1_1c to SL1_6c respectively connected to the first end of the transmission electrodes SE1_1 to SE1_6, and the second transmission signal lines SL1_1d to SL1_6d respectively connected to the second end of the transmission electrodes SE1_1 to SE1_6.

The input sensing layer ISP may include input pads I-PDa extending from one end of the first and second transmission signal lines SL1_1c to SL1_6c and SL1_1d to SL1_6d and the reception signal lines SL2_1a to SL2_4a in the non-effective region NAA. The input pads I-PDa may be electrically connected to the first and second transmission signal lines SL1_1c to SL1_6c and SL1_1d to SL1_6d and the reception signal lines SL2_1a to SL2_4a. According to some embodiments of the present disclosure, the input pads I-PDa include the first transmission input pad T-PD3 to which the first transmission signal lines SL1_1c to SL1_6c are electrically connected, and the second transmission input pad T-PD4 to which the second transmission signal lines SL1_1d to SL1_6d are electrically connected. The input pads I-PDa may further include a reception input pad R-PDa to which the reception signal lines SL2_1a to SL2_4a are electrically connected.

According to some embodiments of the present disclosure, the first and second transmission signal lines SL1_1c to SL1_6c and SL1_1d to SL1_6d and the reception signal lines SL2_1a to SL2_4a may be arranged such that a third interval w3_c is smaller than a first interval w1_c and a second interval w2_c.

In some embodiments, when the input pads I-PDa are arranged in the first direction DR1, second sub-lines SSL2_a, which are electrically connected to the input pads I-PDa, are extended in the second direction DR2 (which is a direction crossing the first direction DR1) in the second region NAA2_a, and have the second interval w2_c. The second direction DR2 may be a orthogonal to the first direction DR1.

In some embodiments, third sub-lines SSL3_a electrically connected to the second sub-lines SSL2_a may have the third interval w3_c, which is smaller than the second interval w2_c, in the third region NAA3_a. The third sub-lines SSL3_a may include a portion extended in the first direction DR1 and a portion extended in the second direction DR2. In addition, according to some embodiments of the present disclosure, each of the third sub-lines SSL3_a may include a portion extended in the fourth direction DR4 or the fifth direction DR5. Each of the third sub-lines SSL3_a may include the portion extending in the first direction DR1 or the portion extending in the fourth direction DR4 and having a small interval with each of adjacent third sub-lines SSL3_a. In addition, the third sub-lines SSL3_a may include both the portion extending in the first direction DR1 and the portion extending in the fourth direction DR4, or both the portion extending in the first direction DR1 and the portion extending in the fifth direction DR5.

In addition, the input pads I-PDa may further include pixel pads D-PD for connecting the flexible circuit film FCB (see FIG. 10) to the display panel DP (see FIG. 10). The input pads I-PDa may be provided as some of the wirings in the circuit element layer DP-CL (see FIG. 11) are exposed from an insulation layer included in the circuit element layer DP-CL.

According to the embodiments of the present disclosure, it is possible to reduce or prevent a ghost touch phenomenon in which an input of an input device provided to a non-effective region in an input sensing layer, in which sensing electrodes are not disposed, is recognized as a valid input. Accordingly, it is possible to reduce or prevent the sensing reliability of a display device and of an electronic device including the display device from being degraded due to the ghost touch phenomenon.

Although the present disclosure has been described with reference to some embodiments of the present disclosure, it will be understood by those skilled in the art that various modifications and changes in form and details may be made therein without departing from the spirit and scope of the present disclosure as set forth in the following claims.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

What is claimed is:

1. A display device comprising:
   a display panel configured to display an image; and
   an input sensing layer on the display panel, the input sensing layer comprising an effective region configured to sense an external input, and a non-effective region adjacent the effective region,
   wherein the input sensing layer comprises:
      sensing electrodes in the effective region;
      signal lines in the non-effective region and electrically connected to the sensing electrodes; and
      input pads in the non-effective region and electrically connected to the signal lines,
   wherein the non-effective region comprises a first region, a second region, and a third region,
   wherein the signal lines comprise:
      first sub-lines in the first region and electrically connected to the sensing electrodes;
      second sub-lines in the second region and electrically connected to the input pads; and
      third sub-lines in the third region and electrically connecting the first sub-lines and the second sub-lines,
   wherein an interval between the third sub-lines in the third region is a first interval that is a constant, and
   wherein the first interval is smaller than a second interval between the first sub-lines and a third interval between the second sub-lines.

2. The display device of claim 1, wherein:
   the non-effective region further comprises a pad region in which the input pads are located;
   the first region is adjacent the effective region;
   the second region is adjacent the pad region; and
   the third region is adjacent the first region and the second region.

3. The display device of claim 1, wherein the sensing electrodes comprise:
   a transmission electrode; and
   a reception electrode electrically insulated from the transmission electrode, and
   wherein the signal lines comprise:
      a transmission signal line electrically connected to the transmission electrode; and
      a reception signal line electrically connected to the reception electrode.

4. The display device of claim 3, wherein the input sensing layer further comprises a first ground line between the transmission signal line and the reception signal line, and
wherein the first ground line is electrically connected to a ground power source.

5. The display device of claim 3, wherein the input sensing layer further comprises a dummy electrode between the transmission signal line and the reception signal line.

6. The display device of claim 5, wherein the input sensing layer further comprises a second ground line surrounding the dummy electrode, and
wherein the second ground line is coupled to a ground power source.

7. The display device of claim 5, wherein the dummy electrode comprises sub-dummy electrodes that are spaced apart from each other.

8. The display device of claim 7, wherein a fourth interval between two adjacent sub-dummy electrodes of the sub-dummy electrodes is substantially the same as the first interval.

9. The display device of claim 5, wherein the transmission signal line comprises:
a first transmission signal line connected to a first end of the transmission electrode; and
a second transmission signal line connected to a second end of the transmission electrode, and
wherein the input pads comprise:
a first transmission input pad electrically connected to the first transmission signal line;
a second transmission input pad electrically connected to the second transmission signal line; and
a reception input pad electrically connected to the reception signal line.

10. The display device of claim 9, wherein the reception input pad is between the first transmission input pad and the second transmission input pad.

11. The display device of claim 10, wherein when the input pads are on the input sensing layer such that the length of the first transmission signal line is greater than the length of the second transmission signal line,
wherein the input sensing layer further comprises a third ground line between the first transmission signal line and the reception signal line, and
wherein the third ground line is electrically connected to a ground power source.

12. The display device of claim 11, wherein the dummy electrode is between the second transmission signal line and the reception signal line,
wherein the input sensing layer further comprises a fourth ground line between the dummy electrode and the second transmission signal line, and
wherein the fourth ground line is electrically connected to the ground power source.

13. The display device of claim 1, wherein the third sub-lines in the third region comprise a step shape.

14. The display device of claim 1, wherein the input pads are arranged in a first direction, and
wherein a third portion in the third region comprises a portion extending in a second direction crossing the first direction.

15. An electronic device comprising:
a display panel configured to display an image;
an input sensing layer on the display panel, configured to operate in a first mode for sensing a first input, or in a second mode for sensing a second input, and comprising an effective region configured to sense the first input or the second input, and a non-effective region adjacent the effective region; and
an input device configured to provide the second input to the input sensing layer,
wherein the input sensing layer comprises:
sensing electrodes in the effective region;
signal lines in the non-effective region and electrically connected to the sensing electrodes; and
input pads in the non-effective region and electrically connected to the signal lines,
wherein the non-effective region comprises a first region, a second region, and a third region,
wherein the signal lines comprise:
first sub-lines in the first region and electrically connected to the sensing electrodes;
second sub-lines in the second region and electrically connected to the input pads; and
third sub-lines in the third region and electrically connecting the first sub-lines and the second sub-lines,
wherein an interval between the third sub-lines in the third region is a first interval which is a constant, and
wherein the first interval is smaller than a second interval between the first sub-lines and a third interval between the second sub-lines.

16. The electronic device of claim 15, wherein the sensing electrodes comprise:
a transmission electrode; and
a reception electrode electrically insulated from the transmission electrode, and
wherein the signal lines comprise:
a transmission signal line electrically connected to the transmission electrode; and
a reception signal line electrically connected to the reception electrode.

17. The electronic device of claim 16, wherein the input sensing layer further comprises a dummy electrode between the transmission signal line and the reception signal line.

18. The electronic device of claim 17, wherein the dummy electrode comprises sub-dummy electrodes spaced apart from each other, and
wherein a fourth interval between two adjacent sub-dummy electrodes of the sub-dummy electrodes is the same as the first interval.

19. The electronic device of claim 17, wherein the transmission signal line comprises:
a first transmission signal line connected to a first end of the transmission electrode; and
a second transmission signal line connected to a second end of the transmission electrode,
wherein the input pads comprise:
a first transmission input pad electrically connected to the first transmission signal line;
a second transmission input pad electrically connected to the second transmission signal line; and
a reception input pad electrically connected to the reception signal line,
wherein the reception input pad is between the first transmission input pad and the second transmission input pad, and
wherein the dummy electrode is between the reception signal line and the second transmission signal line in response to the input pads being on the input sensing layer such that the length of a third sub-line of the first transmission signal line is greater than the length of a third sub-line of the second transmission signal line.

20. The electronic device of claim 15, wherein the first input is an input generated by a contact of a finger of a user, and
wherein the second input is an input generated in response to the input device approaching the electronic device.

* * * * *